United States Patent
Tachibana et al.

(10) Patent No.: US 9,194,768 B2
(45) Date of Patent: Nov. 24, 2015

(54) RIM ASSEMBLY AND TIRE TESTING MACHINE

(71) Applicant: MITSUBISHI HEAVY INDUSTRIES MACHINERY TECHNOLOGY CORPORATION, Hiroshima-shi, Hiroshima (JP)

(72) Inventors: Makoto Tachibana, Tokyo (JP); Jiro Agawa, Tokyo (JP); Morihiro Imamura, Tokyo (JP); Tatsuya Ueda, Tokyo (JP); Yoshinori Miyamoto, Tokyo (JP)

(73) Assignee: MITSUBISHI HEAVY INDUSTRIES MACHINERY TECHNOLOGY CORPORATION, Hiroshima (JP)

( * ) Notice: Subject to any disclaimer, the term of this patent is extended or adjusted under 35 U.S.C. 154(b) by 107 days.

(21) Appl. No.: 14/236,323

(22) PCT Filed: Dec. 26, 2012

(86) PCT No.: PCT/JP2012/083619
§ 371 (c)(1),
(2) Date: Jan. 30, 2014

(87) PCT Pub. No.: WO2013/105436
PCT Pub. Date: Jul. 18, 2013

(65) Prior Publication Data
US 2015/0185113 A1 Jul. 2, 2015

(30) Foreign Application Priority Data

Jan. 12, 2012 (JP) ................................. 2012-004504

(51) Int. Cl.
*G01M 17/02* (2006.01)

(52) U.S. Cl.
CPC ............ *G01M 17/021* (2013.01); *G01M 17/02* (2013.01)

(58) Field of Classification Search
None
See application file for complete search history.

(56) References Cited

U.S. PATENT DOCUMENTS

| 3,043,130 A | 7/1962 | Patterson |
| 5,107,703 A * | 4/1992 | Ota ................................. 73/146 |

(Continued)

FOREIGN PATENT DOCUMENTS

| CN | 1243478 A | 2/2000 |
| CN | 1244255 A | 2/2000 |

(Continued)

OTHER PUBLICATIONS

Office Action mailed Apr. 15, 2015, corresponding to Taiwanese patent application No. 101148992.

(Continued)

*Primary Examiner* — Andre Allen
(74) *Attorney, Agent, or Firm* — Kanesaka Berner & Partners LLP

(57) ABSTRACT

A rim assembly includes a first rim on which a first reference surface is formed, a second rim on which a second reference surface is formed, a through-hole that extends to intersect the first reference surface of the first rim and into which an inserting part is inserted, pins erected on one of the first and second reference surfaces, protruding portions formed on the other of the first and second reference surfaces, first supporting members provided for the first reference surface, and second supporting members provided for the second reference surface. Groove portions with which the protruding portions are engaged are formed around the outer peripheral surfaces of the pins. The first and second supporting members come into contact with each other when the protruding portions are separated from the groove portions, and are separated from each other when the protruding portions are engaged to the groove portions.

7 Claims, 29 Drawing Sheets

(56) References Cited

U.S. PATENT DOCUMENTS

| | | | |
|---|---|---|---|
| 6,131,455 A * | 10/2000 | Matsumoto et al. | 73/462 |
| 6,237,402 B1 | 5/2001 | Reese | |
| 2001/0032499 A1 | 10/2001 | Jenniges et al. | |
| 2006/0107735 A1 | 5/2006 | Merlo | |
| 2011/0226050 A1* | 9/2011 | Nakayama et al. | 73/146 |
| 2013/0233066 A1* | 9/2013 | Wakazono et al. | 73/146 |
| 2013/0233067 A1 | 9/2013 | Wollbrinck et al. | |
| 2014/0060181 A1* | 3/2014 | Tachibana et al. | 73/460 |
| 2014/0069180 A1* | 3/2014 | Ueda et al. | 73/146 |
| 2014/0230534 A1* | 8/2014 | Tachibana et al. | 73/146 |

FOREIGN PATENT DOCUMENTS

| | | |
|---|---|---|
| CN | 1954201 A | 4/2007 |
| CN | 102227623 A | 10/2011 |
| JP | 60-071237 A | 4/1985 |
| JP | 62-135937 U | 8/1987 |
| JP | 63-150643 A | 6/1988 |
| JP | 63-232009 A | 9/1988 |
| JP | 1-155234 A | 6/1989 |
| JP | 02-171633 A | 7/1990 |
| JP | H03-047742 A | 2/1991 |
| JP | H03-110138 A | 5/1991 |
| JP | H03-231834 A | 10/1991 |
| JP | 5-187952 A | 7/1993 |
| JP | 09-070833 A | 3/1997 |
| JP | 2661753 B | 6/1997 |
| JP | 3040514 B | 3/2000 |
| JP | 2001-225603 A | 8/2001 |
| JP | 3672135 B | 4/2005 |
| JP | 2006-051791 A | 2/2006 |
| JP | 2011-174839 A | 9/2011 |

OTHER PUBLICATIONS

Notice of Allowance mailed Apr. 21, 2015, corresponding to Japanese patent application No. 2012-004504.
Office Action mailed Apr. 28, 2015, corresponding to German patent application No. 112012003331.0.
International Search Report mailed Mar. 19, 2013, in International Application No. PCT/JP2012/083619, filed Dec. 26, 2012.
Written Opinion of the International Searching Authority mailed Mar. 19, 2013, in International Application No. PCT/JP2012/083619, filed Dec. 26, 2012.
Office Action dated Jul. 3, 2015, corresponding to Chinese patent application No. 201280035823.7, for which an explanation of the relevance is attached.

* cited by examiner

RIM ASSEMBLY AND TIRE TESTING MACHINE

RELATED APPLICATIONS

This application is a National Phase of International Application Number PCT/JP2012/083619, filed Dec. 26, 2012, and claims priority from Japan Application Number 2012-004504, filed Jan. 12, 2012.

TECHNICAL FIELD

The present invention relates to a rim assembly on which a tire as a test object is mounted, and a tire testing machine.

BACKGROUND ART

As tire testing machines, there is a tire uniformity measuring apparatus that measures the uniformity of a tire, and a tire balance measuring apparatus that measures the balance of a tire. In measurement by the tire testing machines, a rim assembly to which a tire that is a test object is attached is changed for every type of tire according to bead diameter or bead width.

Generally, the rim assembly is used by combining a lower rim (first rim) and an upper rim (second rim) that are attachable to and detachable from each other. The lower rim and the upper rim are formed in a substantially columnar shape or a substantially disk shape, respectively.

In order for the types of tires as measurement objects to cope with a number of cases, methods for automatically replacing the rim assembly for the purpose of shortening the changing time of the rim assembly or saving changing work have been proposed. Inventions regarding rim replacing apparatuses are disclosed in Patent Documents 1 to 3.

PRIOR ART DOCUMENT

Patent Document

Patent Document 1: Japanese Patent No. 2661753
Patent Document 2: Japanese Unexamined Patent Application, First Publication No. H03-110138
Patent Document 3: Japanese Patent No. 3672135

SUMMARY OF INVENTION

Problem to be solved by the Invention

To axially mount and demount the lower rim and the upper rim, a bayonet type joining part may be used. This joining part is constituted by, for example, a hook (pin) provided on the lower rim and a receiving portion (protruding portion) provided in the upper rim and engaged with the hook. By inserting the hook into the upper rim and twisting the rims, a tip portion of the hook engages the receiving portion, and the rims are connected together.

To mount the rim assembly on a spindle (inserting part) when the rim assembly is exchanged, the spindle may be inserted into a through-hole of each of the lower rim and the upper rim. When a gap between the through-hole and the spindle is small, an inner circumferential surface of the through-hole of the lower rim may come into contact with the spindle, and the lower rim may be inclined. In this case, the lower rim cannot be smoothly inserted into the spindle. In this case, operating the upper rim to push the hooks using the receiving portions may be considered. However, when a great force is applied to the hooks, the hooks may be deformed.

An object of the present invention is to provide a rim assembly and a tire testing machine in which, even when an upper rim is pushed toward a lower rim, a pushing force is inhibited from being applied to pins.

Means for Solving the Problem

A first aspect of a rim assembly of the present invention, in which the rim assembly is inserted into an inserting part of a tire testing machine and on which a tire as a test object is mounted, includes: a first rim on which a first reference surface is formed; a second rim on which a second reference surface is formed; a through-hole which extends to intersect the first reference surface of the first rim, and into which the inserting part is capable of being inserted; pins which are erected on one of the first reference surface and the second reference surface, and around outer peripheral surfaces of which groove portions are formed; protruding portions which are formed on the other of the first reference surface and the second reference surface, and are capable of being engaged with the groove portions when the first rim is rotated around an axis of the first rim relative to the second rim in a state in which the second reference surface is caused to face the first reference surface; first supporting members that are provided for the first reference surface; and second supporting members which are provided for the second reference surface, are brought into contact with the first supporting members when the first and second reference surfaces approach each other with the protruding portions disposed inside the groove portions and the protruding portions are separated from opposite side surfaces of the groove portions, and are separated from the first supporting members when the first and second reference surfaces are separated from each other and the protruding portions are engaged with the opposite side surfaces of the groove portions.

According to the present invention, when the first rim is suspended below the second rim with the protruding portions disposed inside the groove portions, the protruding portions are engaged with the opposite side surfaces of the groove portions. Thereby, the first rim is supported by the second rim.

When an inserting part of a tire testing machine is inserted into the through-hole of the first rim with the first rim supported below the second rim, the inserting part may not be smoothly inserted into the through-hole when a gap between the through-hole and the inserting part is small. In this case, the second rim is operated to push the first rim downward. However, the second supporting members are brought into contact with the first supporting members. Thereby, a downward force applied to the second rim can be reliably transmitted to the first rim. In this case, the protruding portions are separated from the opposite side surfaces of the groove portions. As such, the pushing force can be inhibited from being applied to the pins.

A second aspect of the rim assembly of the present invention is configured so that, in the first aspect, the rim assembly further includes insertion opening portions that are formed on extension lines of the protruding portions around the axis and are configured to dispose the groove portions of the pins, and at least one of the first and second supporting members is formed to extend around the axis and overlap in a direction of the axis even in both states in which the pins are inserted into the insertion opening portions and in which the protruding portions are disposed inside the groove portions.

According to the present invention, the second rim is disposed on the first rim so that the first and second reference surfaces face each other, and the first and second supporting members are brought into contact with each other while the pins are inserted into the insertion opening portions. The first rim and the second rim are relatively rotated around the axis from this state. Thereby, the protruding portions can be easily disposed inside the groove portions.

Since at least one of the first and second supporting members is formed to extend around the axis, in each case in which the first rim and the second rim are relatively rotated, the first and second supporting members are in contact with each other. Accordingly, the second rim can be stably supported on the first rim by the first and second supporting members.

A third aspect of the rim assembly of the present invention is configured so that, in the first or second aspect, the first supporting members have convex portions formed to protrude from surfaces coming into contact with the second supporting members in a state in which the protruding portions are disposed inside the groove portions, and the second supporting members have concave portions capable of being engaged with the convex portions when the first supporting members and the second supporting members are brought into contact with each other.

According to the present invention, the second rim is disposed to overlap on the first rim while the concave portions are engaged with the convex portions. To release this engagement, the second rim is required to be lifted with respect to the first rim. The first rim and the second rim are relatively rotated around the axis by gravity applied to the second rim, and it is possible to prevent phases around the axis of the first and second rims from deviating.

A fourth aspect of the rim assembly of the present invention is configured so that, in the third aspect, the second supporting members have guide concave portions extending from positions facing the convex portions in directions of the protruding portions around the axis when the pins are inserted into the insertion opening portions, the concave portions are provided at the positions facing the convex portions when the protruding portions are disposed inside the groove portions, and the guide concave portions and the concave portions are disposed in parallel so as to be separated from each other around the axis.

According to the present invention, when first supporting members and the second supporting members come into contact with each other while the pins are inserted into the insertion opening portions, the convex portions are engaged with the guide concave portions. When the first rim and the second rim are relatively rotated around the axis from this state so that the protruding portions are disposed inside the groove portions, the convex portions move along the guide concave portions. As such, the second rim is inhibited from rattling up and down with respect to the first rim, and the second rim can be smoothly rotated.

When the first rim and the second rim are relatively rotated further, and the convex portions pass over the guide concave portions, since the guide concave portions and the concave portions are disposed around the axis in parallel, the convex portions are easily engaged with the concave portions. When the convex portions are engaged with the concave portions, it is difficult for the second rim to overcome a height difference between the guide concave portion and the concave portion and rotate due to gravity applied to the second rim. As such, it is possible to prevent the phases around the axis of the first and second rims from deviating.

A fifth aspect of the rim assembly of the present invention is configured so that, in one of the second to fourth aspects, the second supporting members have supporting member-side walls that are provided on surfaces coming into contact with the first supporting members in directions of the protruding portions for the insertion opening portion around the axis based on the first supporting members when the convex portions are engaged with the concave portions and are capable of coming into contact with the first supporting members.

According to the present invention, when the convex portions are engaged with the concave portions, the first supporting members are prevented from being rotated around the axis to the protruding portion side for the insertion opening portions. Thereby, it is possible to more reliably prevent the phases around the axis of the first and second rims from deviating.

A sixth aspect of the rim assembly of the present invention is configured so that, in one of the second to fifth aspects, the protruding portions have pin-side walls that are provided in directions of the protruding portions for the insertion opening portion around the axis based on the pins when the protruding portions are disposed inside the groove portions and are capable of coming into contact in directions of base ends of the pins rather than the groove portions in the pins.

According to the present invention, when the protruding portions are disposed inside the groove portions, the pins are prevented from being rotated around the axis to the protruding portion side for the insertion opening portions. Thereby, it is possible to more reliably prevent the phases around the axis of the first and second rims from deviating.

An aspect of a tire testing machine of the present invention is configured to include:

the rim assembly according to any one of the first to sixth aspects of the rim assembly of the present invention;

an inserting part capable of being inserted into a through-hole formed in the first rim; and a rotating part configured to rotate the inserting part around the axis of the inserting part.

According to the present invention, the tire is mounted on the rim assembly, and the inserting part is inserted into the through-hole of the first rim. Thereby, the rim assembly is mounted on the inserting part. The inserting part is rotated around the axis by the rotating part. Thereby, the mounted rim assembly and tire can be rotated and tested.

Effect of the Invention

According to the rim assembly and the tire testing machine of the present invention, even when the upper rim is pushed to the side of the lower rim, a pushing force can be inhibited from being applied to the pins.

DESCRIPTION OF EMBODIMENTS

Hereinafter, an embodiment of a tire testing machine according to the present invention will be described with reference to FIGS. 1 to 31.

In the following embodiment, a description will be made of the case in which a tire testing machine is a tire uniformity measuring apparatus (hereinafter abbreviated as "tire measuring apparatus").

Figure 1:
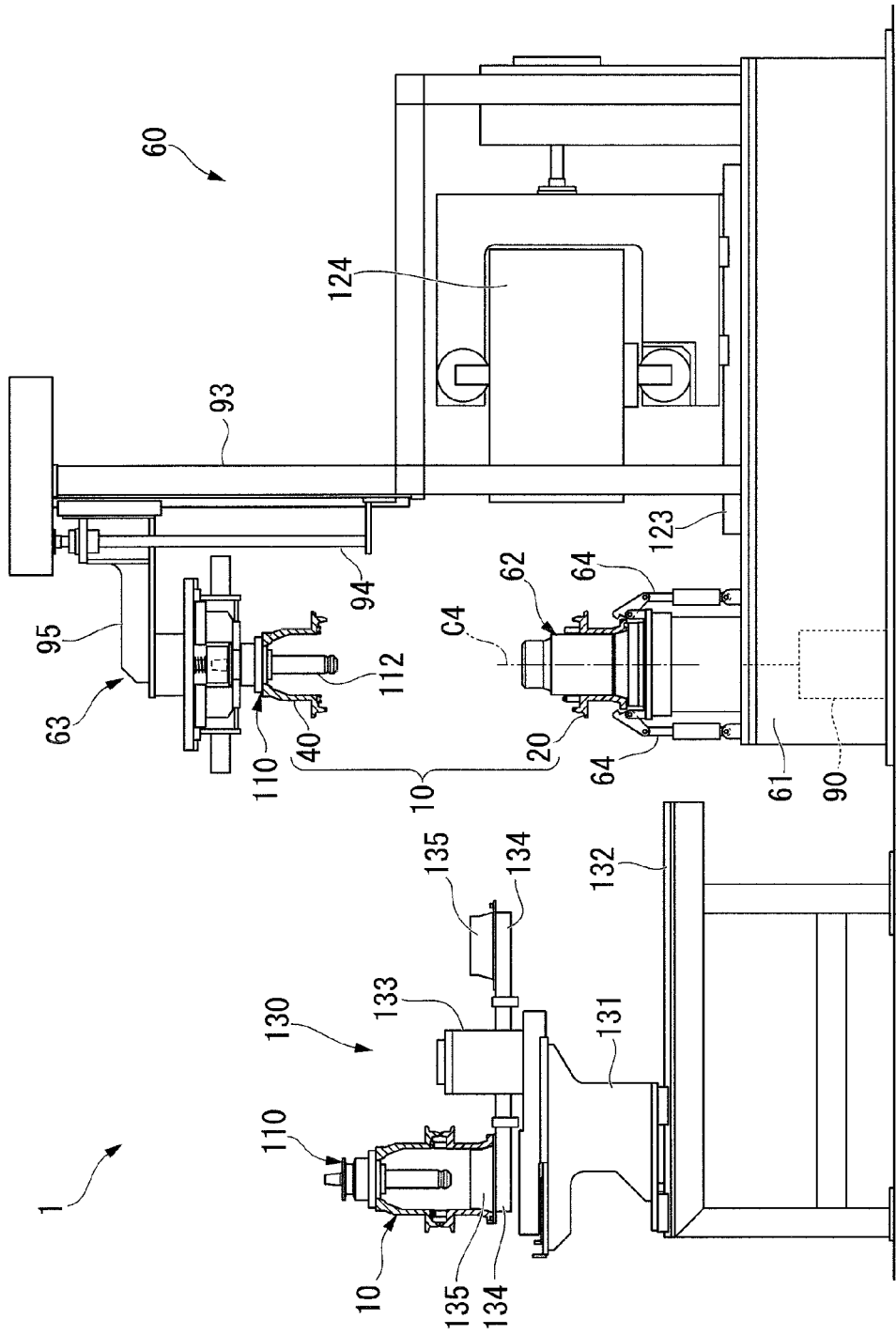
FIG. 1 is an explanatory view of a tire uniformity measuring apparatus of a first embodiment of the present invention.

As shown in FIG. 1, the tire measuring apparatus 1 of the present embodiment includes a rim assembly 10 on which a tire that is a test object is mounted, a body unit 60 on which the rim assembly 10 is detachably mounted and which rotates the mounted rim assembly 10 around its axis to perform measurement, and a rim change unit 130 for replacing the rim assembly 10 mounted on the body unit 60.

The tire measuring apparatus 1 is equipped with various types of rim assemblies 10 having different outer diameters depending on a type of the tire to be measured. Hereinafter, one of the rim assemblies 10 will be described.

Figure 2:
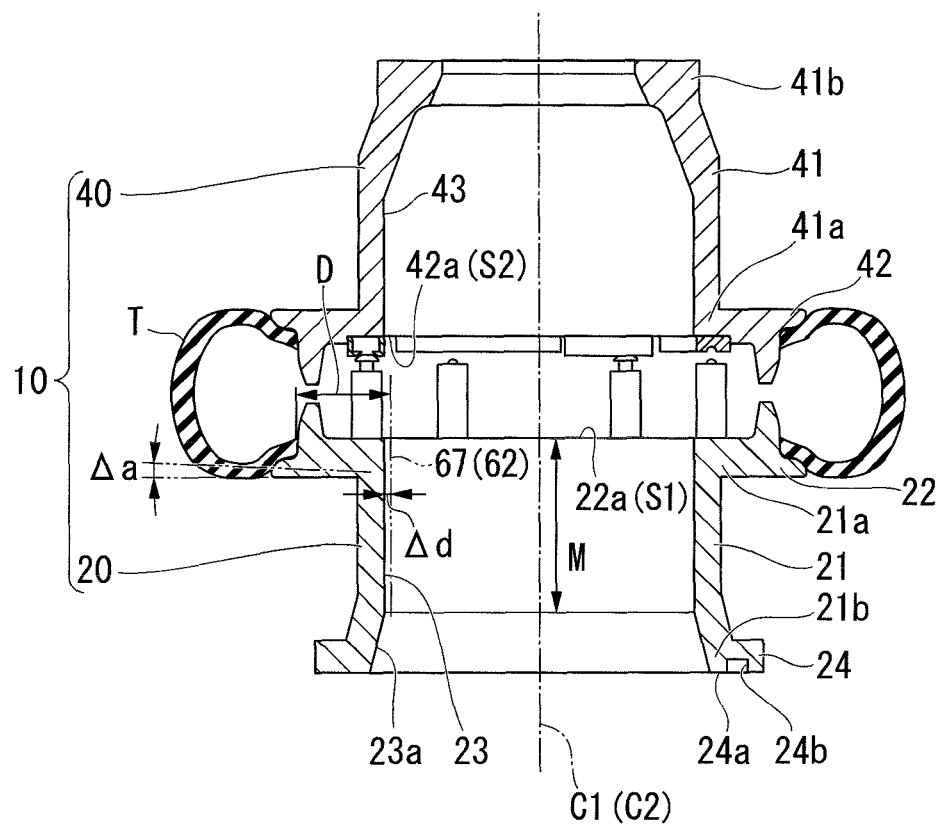
FIG. 2 is a cross-sectional view showing a rim assembly of the first embodiment of the present invention and describing a state in which the rim assembly is mounted on a lower spindle of the tire uniformity measuring apparatus.

FIG. 2 is a cross-sectional view showing a state of the rim assembly 10 mounted on a lower spindle 62 (to be described below) of the body unit 60. In FIG. 2, for the convenience of description, the lower spindle 62 is not shown.

The rim assembly 10 has a lower rim (first rim) 20 and an upper rim (second rim) 40. In a state in which a first reference surface S1 set for the lower rim 20 and a second reference surface S2 set for the upper rim 40 are opposite to each other, both of the rims 20 and 40 allow the reference surfaces to be engaged with or disengaged from each other.

The lower rim 20 has a body 21 formed in an approximately cylindrical shape, and a collar portion 22 provided on an outer peripheral surface of an upper end 21a of the body 21. The first reference surface S1 is formed on a principal surface 22a of the collar portion 22 which is located on the opposite side of a lower end 21b of the body 21.

The body 21 is provided with a lower through hole (through-hole) 23 extending to be perpendicular to the first reference surface S1. In the lower through hole 23, an inner circumferential surface of the lower end 21b is provided with a rim-side inclined surface 23a whose diameter is increased as being set apart from the end portion 21a. The rim-side inclined surface 23a is formed in the shape of a side surface of a truncated cone.

An outer peripheral surface of the lower end 21b of the body 21 is provided with a second collar portion 24. A principal surface 24a of the second collar portion 24 which is located on the opposite side of the collar portion 22 is provided with a positioning hole portion 24b.

Figure 3:
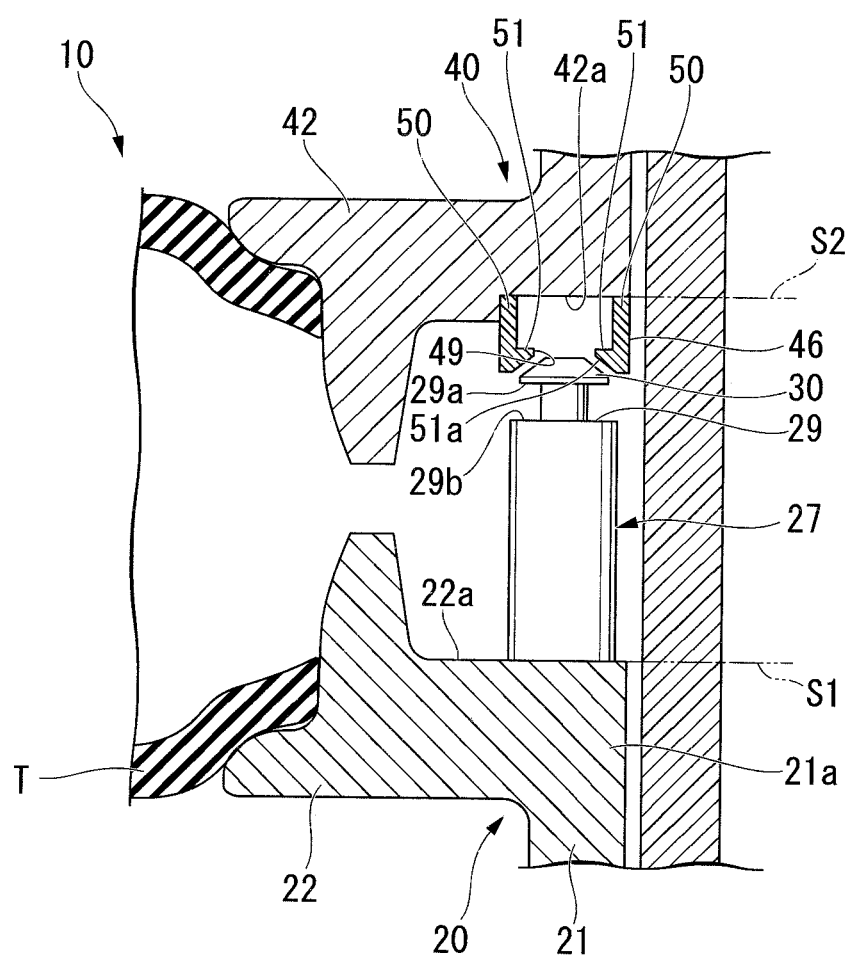
FIG. 3 is an enlarged view of pin-side main portions of FIG. 2.
Figure 4:
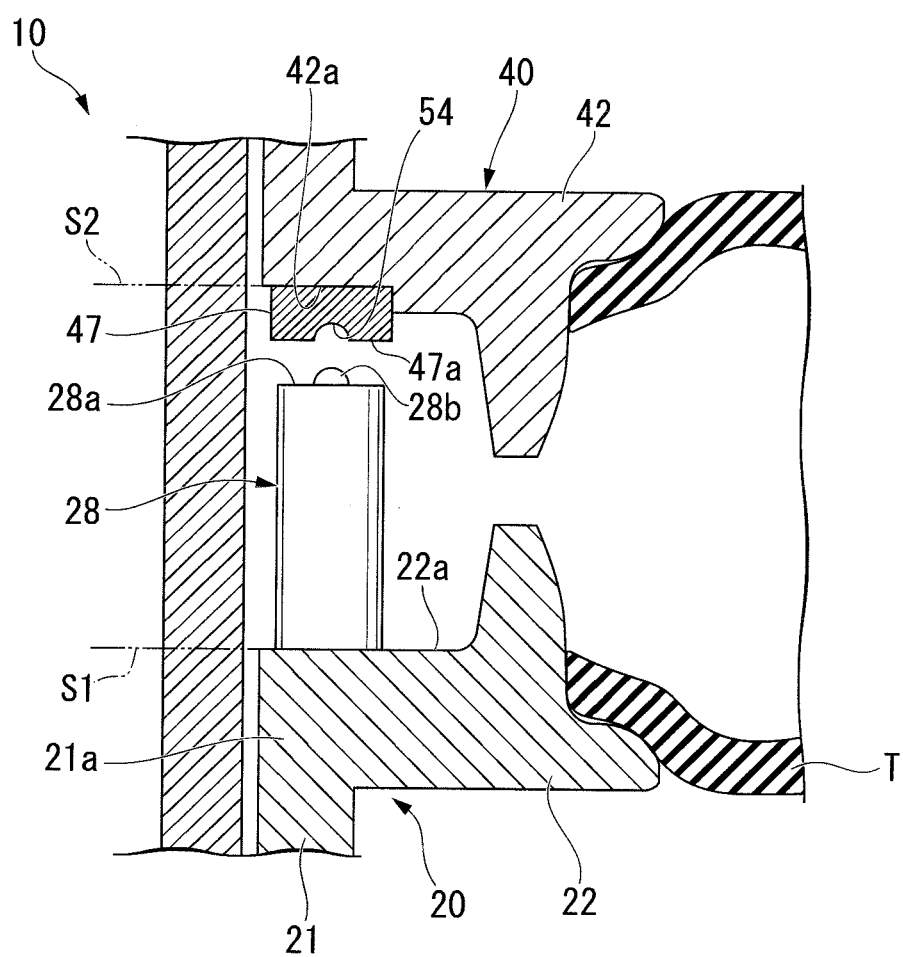
FIG. 4 is an enlarged view of stand-side main portions of FIG. 2.
Figure 5:
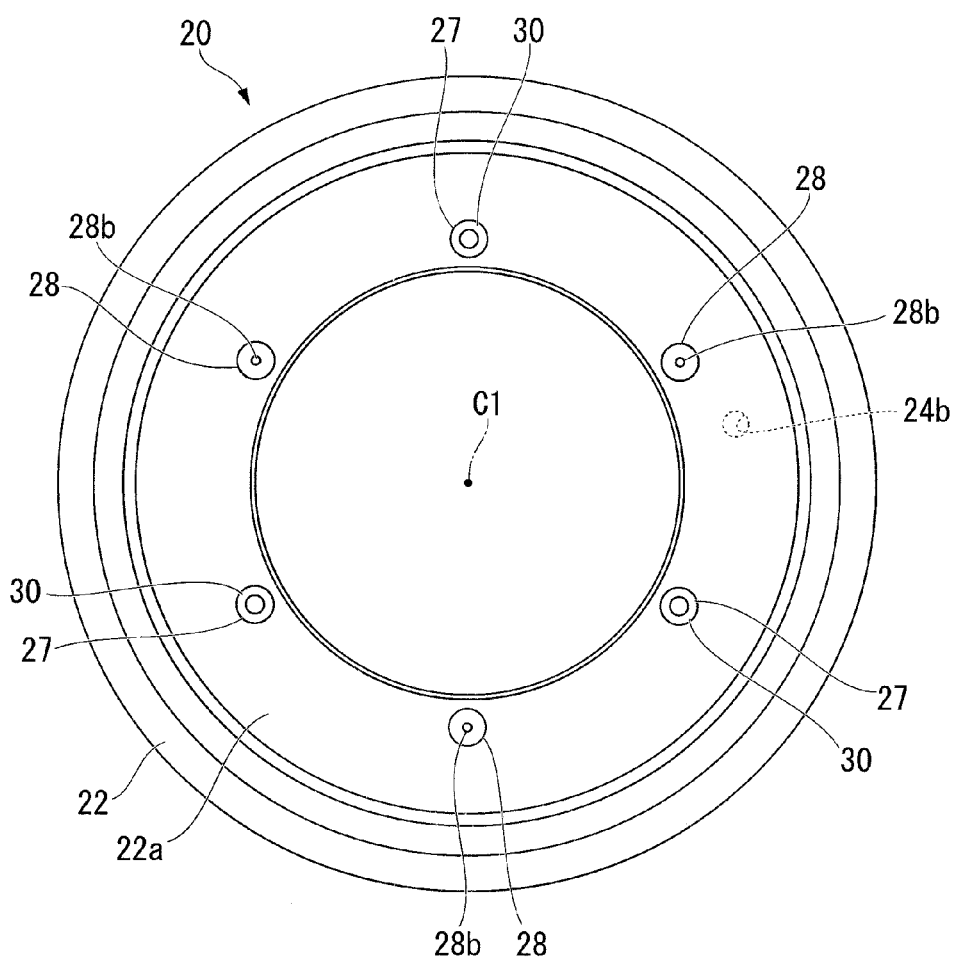
FIG. 5 is a plan view of a lower rim of the tire uniformity measuring apparatus.

As shown in FIGS. 3 to 5, pins 27 and stands (first supporting members) 28 are erected on the principal surface 22a of the collar portion 22. The three pins 27 and the three stands 28 are alternately arranged at equal angles around an axis C1 of the lower rim 20.

As shown in FIGS. 3 and 5, each pin 27 is formed in an approximately collar shape, and has a groove portion 29 formed throughout an outer peripheral surface thereof at a tip side (upper side) thereof in an erection direction. A side surface 29a on the tip side of the groove portion 29 and a side surface 29b on a base end side of the groove portion 29 are each formed to be parallel to the principal surface 22a. A tip side from the groove portion 29 of each pin 27 becomes a tapered projection portion 30 whose diameter decreases as being brought close to the tip.

As shown in FIGS. 4 and 5, each stand 28 is formed in a collar shape, and a tip face 28a thereof is provided with an approximately semispherical convex portion 28b protruding from the tip face 28a.

The tire T to be tested is adapted to be mounted on an edge side farther than a portion at which the pins 27 and the stands 28 are provided on the principal surface 22a of the collar portion 22.

As shown in FIG. 2, the upper rim 40 has a body 41 formed in an approximately cylindrical shape, and a collar portion 42 provided on an outer peripheral surface of a lower end 41a of the body 41. The second reference surface S2 is formed on a principal surface 42a of the collar portion 42 which is located on the opposite side of an upper end 41b of the body 41.

The body 41 is provided with an upper through hole 43 extending to be perpendicular to the second reference surface S2.

Figure 6:
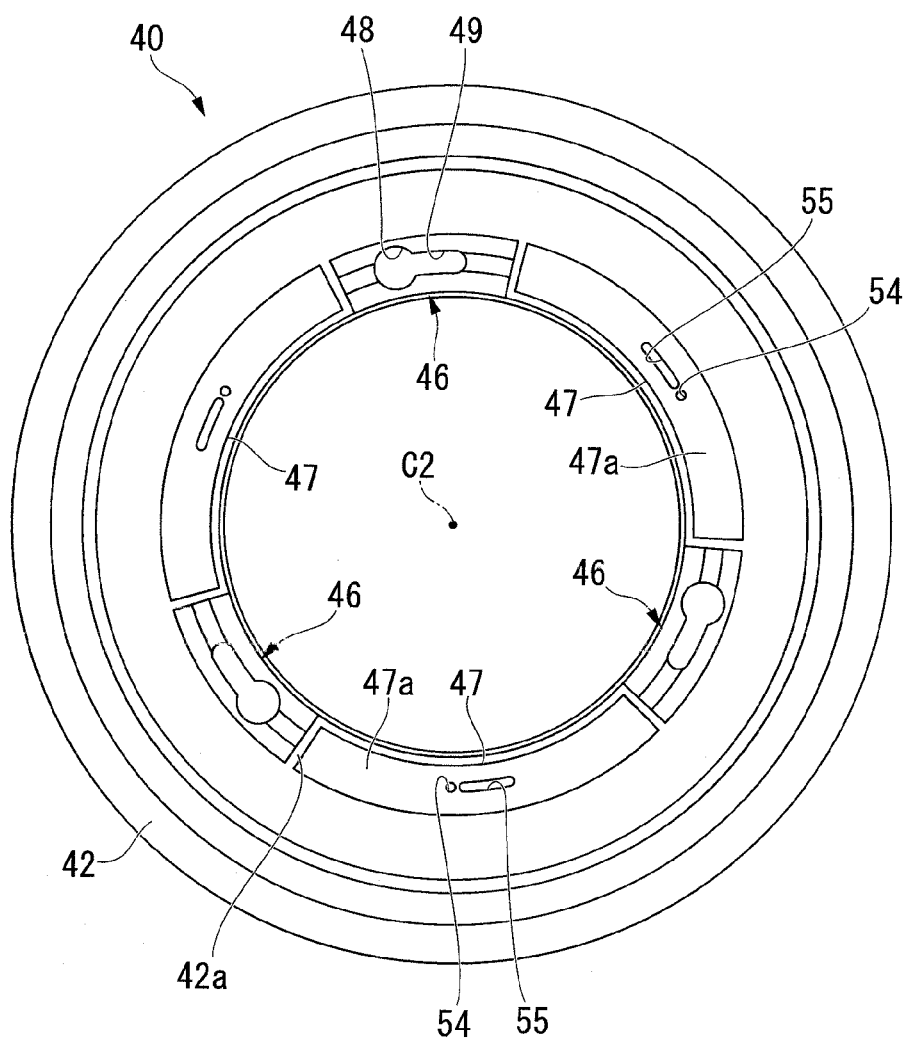
FIG. 6 is a bottom view of an upper rim of the tire uniformity measuring apparatus.

As shown in FIGS. 3, 4, and 6, the principal surface 42a of the collar portion 42 is provided with pin receiving portions 46 and stand receiving portions (second supporting members) 47. The three pin receiving portions 46 and the three stand receiving portions 47 are alternately disposed around an axis C2 of the upper rim 40 at equal angles.

Figure 7:
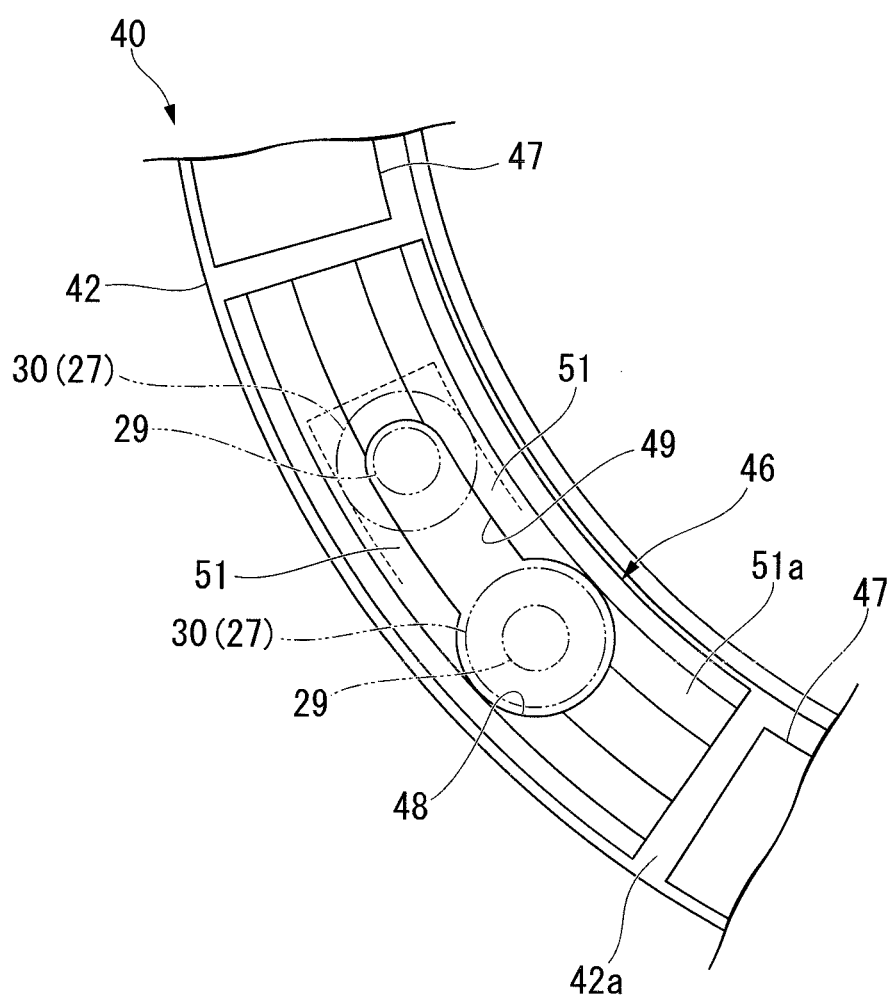
FIG. 7 is a bottom view for describing an engagement state of pins and pin receiving portions of the tire uniformity measuring apparatus.

As shown in FIGS. 3 and 7, each pin receiving portion 46 is provided with an insertion opening portion 48 and a sliding opening portion 49. The insertion opening portion 48 and the sliding opening portion 49 communicate with each other. The projection portion 30 of the pin 27 can move in and out of the insertion opening portion 48. The sliding opening portion 49 is formed in a part of the insertion opening portion 48, and is open in a circumferential direction of the upper rim 40. A width of the sliding opening portion 49 is smaller than an outer diameter of the projection portion 30 of the pin 27, and is larger than an outer diameter of the groove portion 29.

Figure 8:
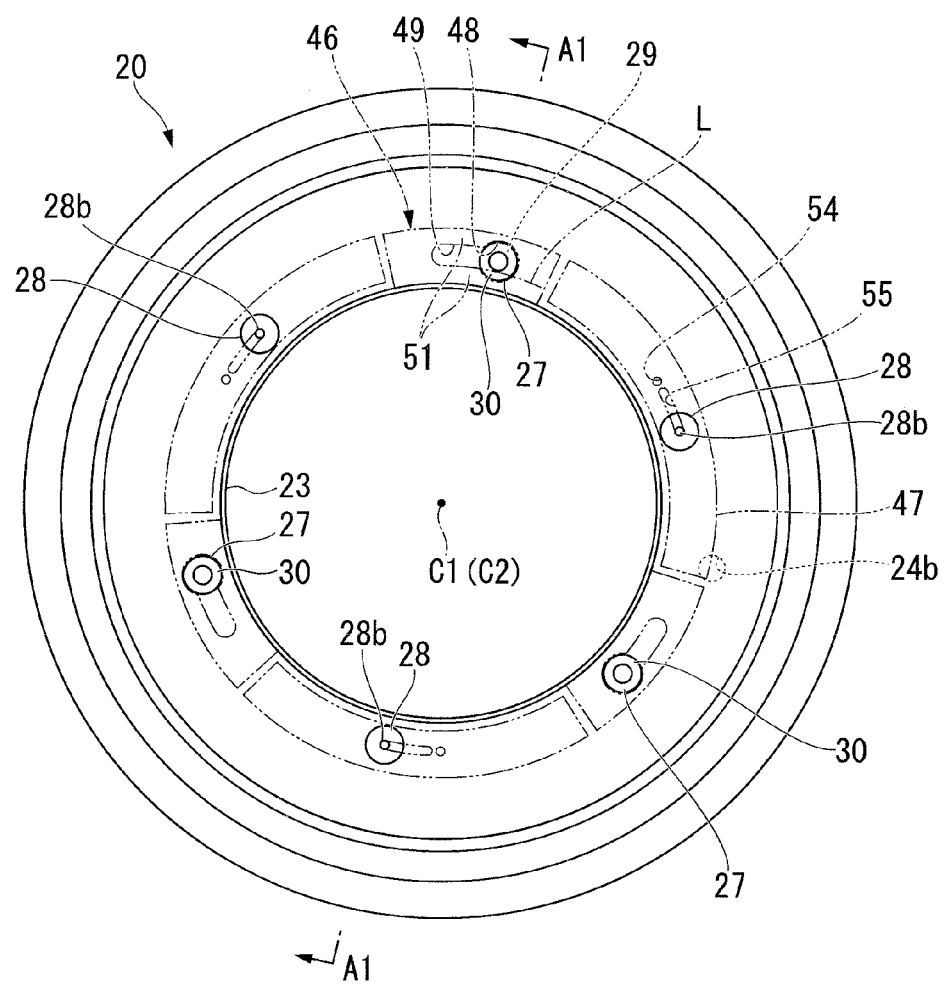
FIG. 8 is a plan view for describing a state in which the pins of the lower rim are disposed inside pin inserting parts of the pin receiving portions.

As shown in FIG. 8, when viewed from the top, the sliding opening portion 49 is disposed in a counterclockwise direction with respect to the insertion opening portion 48.

As shown in FIGS. 3 and 7, the pin receiving portion 46 has a pair of wall portions 50 erected from the principal surface 42a so as to face each other, and a pair of protruding portions 51 provided to extend from tips of the respective wall portions 50 toward facing tip sides of the wall portions 50. The sliding opening portion 49 to be described below is formed by a gap between the pair of protruding portions 51 that extend so as to be brought close to each other.

Each of the wall portions 50 extends in the circumferential direction of the upper rim 40, and an interval between the wall portions 50 is wider than the outer diameter of the projection portion 30 of the pin 27. A distance from the principal surface 42a to the protruding portion 51 is longer than a length of the projection portion 30. A thickness dimension of the protruding portion 51 is set to be shorter than a distance between the side surfaces 29a and 29b of the groove portion 29. When the protruding portions 51 are disposed inside the groove portion 29, the protruding portions 51 are formed to be capable of being separated from any of the side surfaces 29a and 29b.

Each of the wall portions 50 extends in the circumferential direction of the upper rim 40, and an interval between the wall portions 50 is wider than the outer diameter of the projection portion 30 of the pin 27. A distance from the principal surface 42a to the protruding portion 51 is longer than a length of the projection portion 30. A thickness dimension of the protruding portion 51 is set to be shorter than a distance between the side surfaces 29a and 29b of the groove portion 29. When the protruding portions 51 are disposed inside the groove portion 29, the protruding portions 51 are formed to be capable of being separated from any of the side surfaces 29a and 29b.

Surfaces of the protruding portions 51 which are located on the opposite side of the principal surface 42a are provided with concave grooves 51a that can hold the projection portion 30 of the pin 27 and are formed in a concave shape.

As shown in FIG. 6, when viewed from the bottom, the stand receiving portions 47 are formed in the circumferential direction of the upper rim 40 in an arc shape. In other words, the stand receiving portions 47 are formed to extend around the axis C2.

As shown in FIG. 4, a tip face 47a of the stand receiving portion 47 is formed to be parallel to the principal surface 42a.

As shown in FIGS. 4 and 6, each tip face 47a is provided with a concave portion 54 and a guide concave portion 55. When the tip face 28a of the stand 28 comes into contact with the tip face 47a of the stand receiving portion 47, the concave portion 54 and the guide concave portion 55 can be engaged with the convex portion 28b of the stand 28.

Figure 10:
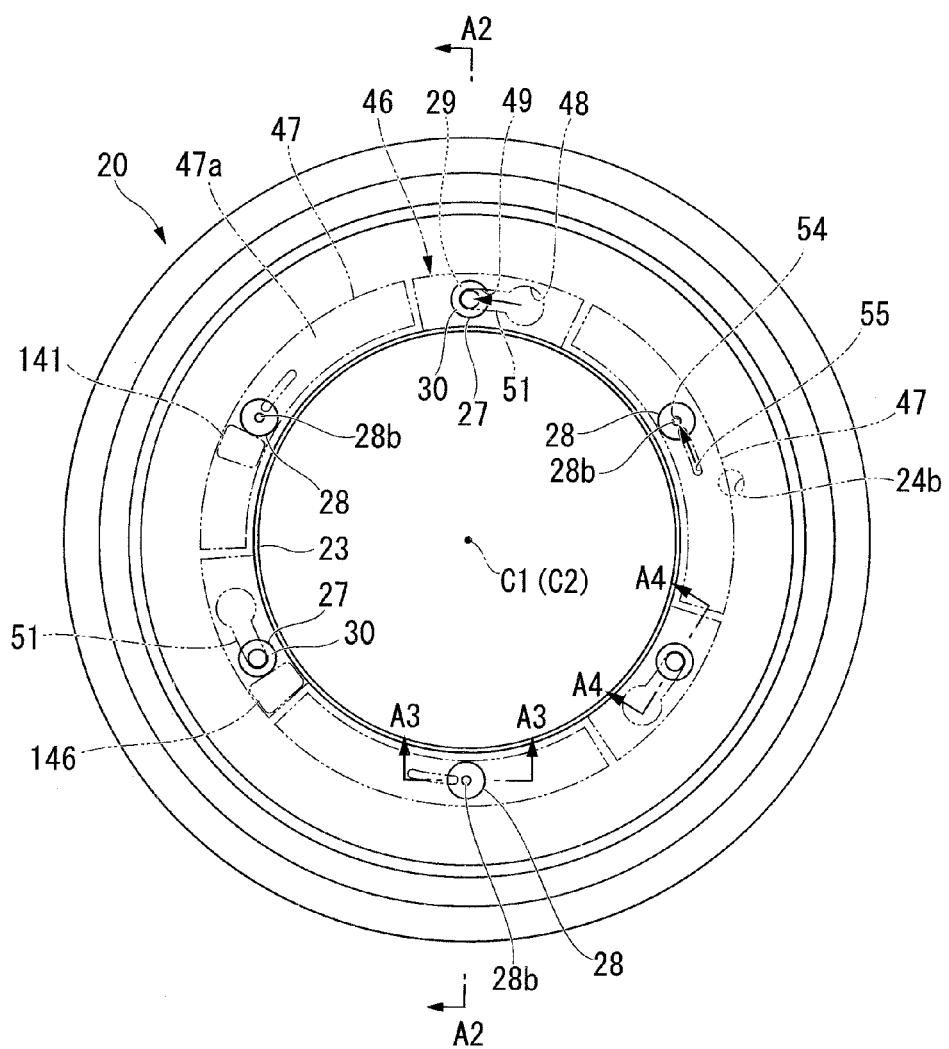
FIG. 10 is a plan view for describing a state in which protruding portions are disposed inside groove portions of the pins of the lower rim.
Figure 11:
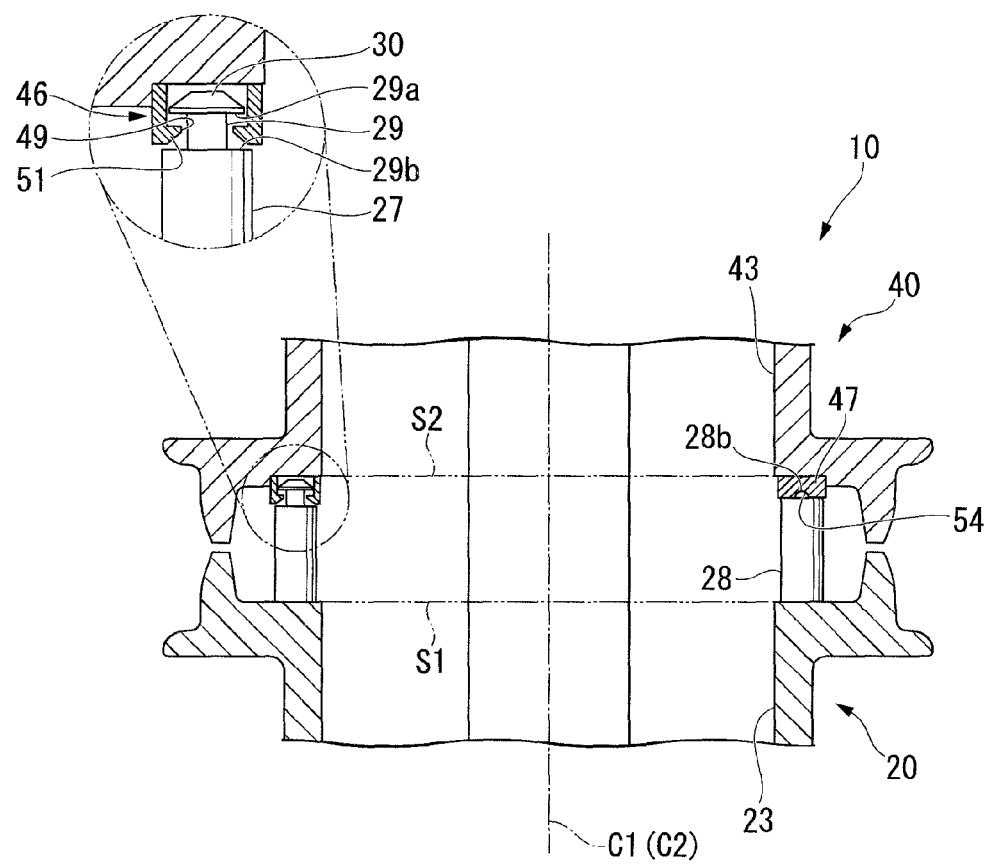
FIG. 11 is a cross-sectional view taken along line A2-A2 of FIG. 10.
Figure 12:
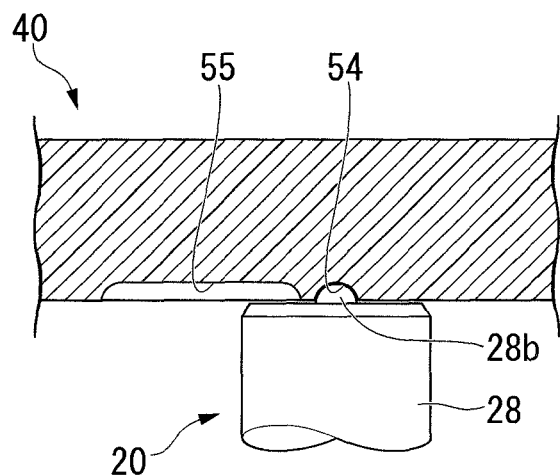
FIG. 12 is a cross-sectional view taken along line A3-A3 of FIG. 10.
Figure 13:
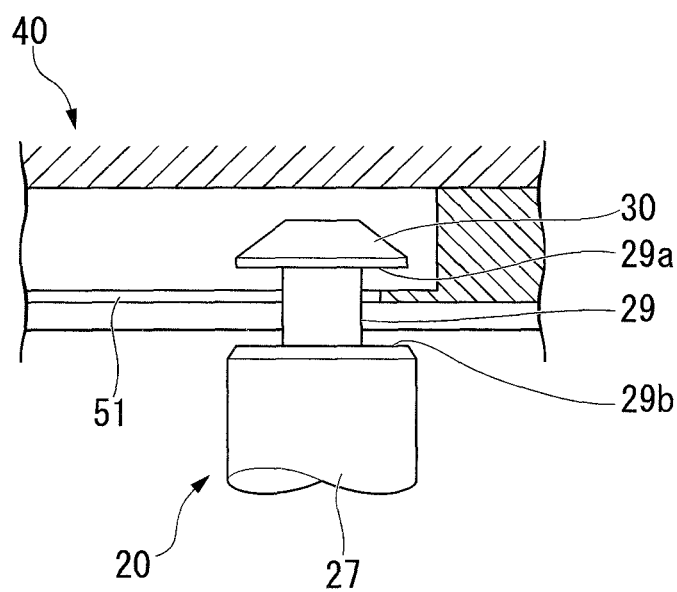
FIG. 13 is a cross-sectional view taken along line A4-A4 of FIG. 10.

As shown in FIGS. 10 and 11, when the protruding portions 51 are disposed inside the groove portion 29, the concave portion 54 is provided at a position facing the convex portion 28b of the stand 28.

Figure 9:
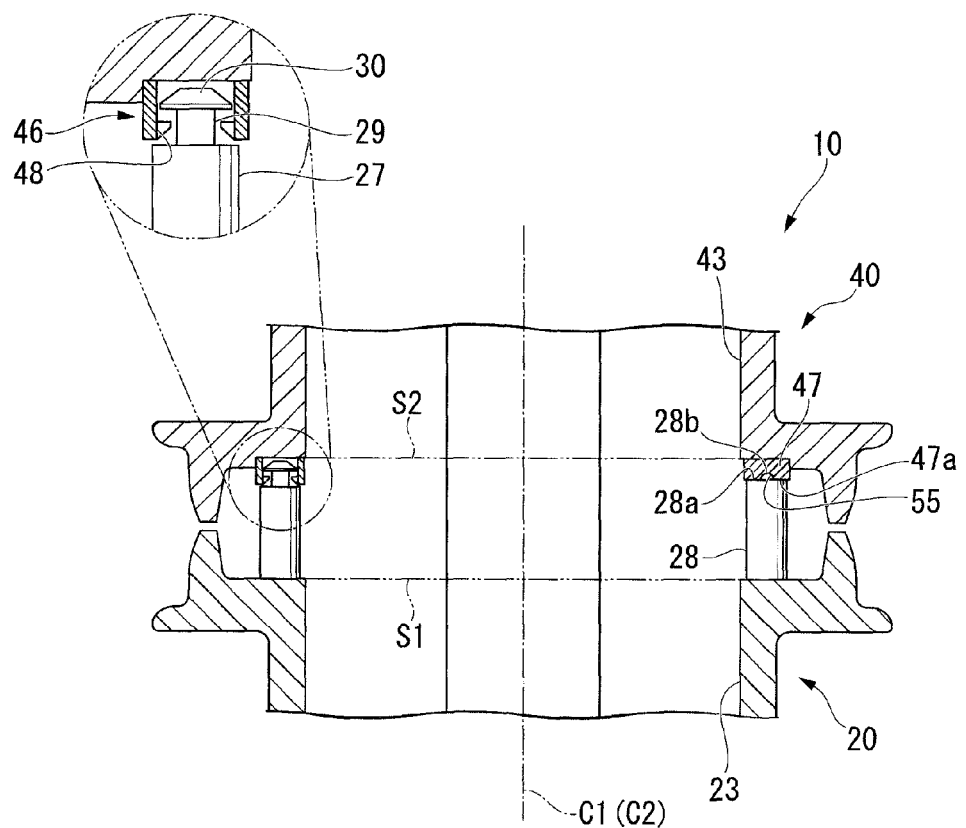
FIG. 9 is a cross-sectional view taken along line A1-A1 of FIG. 8.

As shown in FIGS. 8 and 9, when viewed from the top, when the projection portion 30 of the pin 27 is inserted into the insertion opening portion 48, the guide concave portion 55 is formed to extend from the position facing the convex portion 28b around the axis C2 in a counterclockwise direction. The guide concave portion 55 is formed to extend to the side of the sliding opening portion 49 communicating with the insertion opening portion 48 into which the projection portion 30 is inserted.

As shown in FIG. 8, when viewed from the top, when the rims 20 and 40 overlap so that the axes C1 and C2 are coincident with each other, the convex portion 28b of the stand 28 and the concave portion 54 and guide concave portion 55 of the stand receiving portion 47 are disposed on circumferences of reference circles centered at the axes C1 and C2, respectively.

The concave portion 54 is formed in a hollow shape having a slightly larger shape than the convex portion 28b. The guide concave portion 55 has a shape in which the concave portion 54 extends around the axis C2.

As shown in FIG. 8, when viewed from the top, the concave portion 54 is disposed in parallel to the guide concave portion 55 so as to be separated therefrom around the axis C2 in the counterclockwise direction.

The tire T as a test object is adapted to be mounted on an edge side farther than a portion at which the pin receiving portions 46 and the stand receiving portions 47 are provided on the principal surface 42a of the collar portion 42.

An engagement state of the rim assembly 10 will be described.

When the rim assembly 10 is dismounted from the body unit 60 and is disposed on the rim change unit 130, the lower rim 20 is disposed on a floor, and the upper rim 40 engaged with the lower rim 20 is disposed on the lower rim 20.

As will be described below, to engage the lower rim 20 and the upper rim 40, the pins 27 and the pin receiving portions 46 described above are engaged. In this case, the stands 28 and the stand receiving portions 47 are brought into contact with or separated from each other by the engagement state of the pins 27 and the pin receiving portions 46.

As shown in FIGS. 8 and 9, the upper rim 40 is disposed above the lower rim 20 so that the respective reference surfaces S1 and S2 are opposite to each other. The projection portions 30 of the pins 27 are inserted into the insertion opening portions 48, and the stands 28 are brought into contact with the stand receiving portions 47. Thereby, the groove portions 29 of the pins 27 are disposed on extension lines L of the protruding portions 51 around the axis C2, and the convex portions 28b of the stands 28 are engaged with the guide concave portions 55 of the stand receiving portions 47. The lower through hole 23 of the lower rim 20 and the upper through hole 43 of the upper rim 40 are in communication with each other.

As shown in FIGS. 10 and 11, when the lower rim 20 is rotated around the axis C1 with respect to the upper rim 40 from this state, the protruding portions 51 of the upper rim 40 are first disposed inside the groove portions 29 of the lower rim 20 while the stands 28 come into contact with the stand receiving portions 47. Subsequently, the convex portions 28b are changed from a state in which they are engaged with the guide concave portions 55 to a state in which they are engaged with the concave portions 54 (see FIG. 12).

When the convex portions 28b pass over the guide concave portions 55 to move to the concave portions 54, the upper rim 40 temporarily moves upward relative to the lower rim 20. When the stands 28 are in contact with the stand receiving portions 47, the protruding portions 51 are separated from both of the side surfaces 29a and 29b of the groove portions 29 (see FIG. 13).

As described above, since the stand receiving portions 47 are formed in the arc shape, the stand receiving portions 47 and the stands 28 overlap in the direction of the axis C1 in both states in which the pins 27 are inserted into the insertion opening portion 48 and in which the protruding portions 51 are disposed inside the groove portions 29, and the stands 28 can be brought into contact with the stand receiving portions 47.

Figure 14:
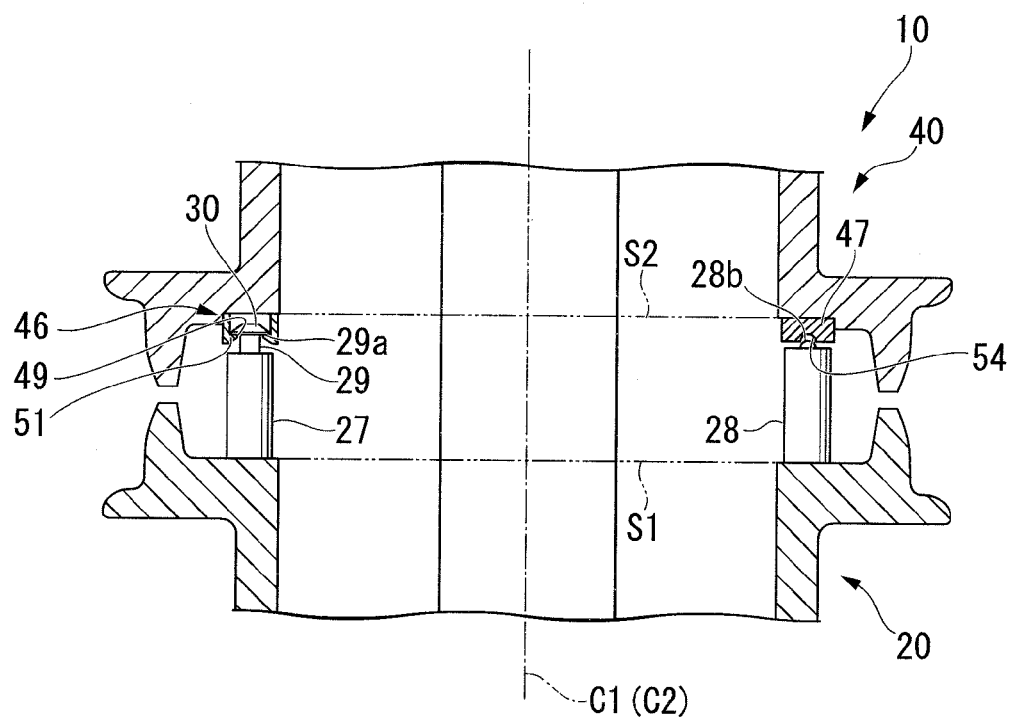
FIG. 14 is a cross-sectional view for describing a state in which the upper rim in which the protruding portions are disposed inside the groove portions of the pins of the lower rim is lifted.

As shown in FIG. 14, when the upper rim 40 is lifted upward from a state in which the convex portions 28b are engaged with the concave portions 54, the lower rim 20 moves to be separated from the upper rim 40 due to gravity applied to the lower rim 20. The first reference surface S1 moves to be separated from the second reference surface S2. In this case, the side surfaces 29a of the groove portions 29 are engaged with the protruding portions 51, and the pin receiving portions 46 support the pins 27. The lower rim 20 is hung from the upper rim 40. The stands 28 are separated from the stand receiving portions 47, and the engagement of the convex portions 28b and the concave portions 54 is released.

As described above, when the rim assembly 10 is demounted from the body unit 60, the protruding portions 51 are disposed inside the groove portions 29. Thereby, both of the rims 20 and 40 are engaged.

On the other hand, when the rim assembly 10 is mounted on the body unit 60, the engagement of both of the rims 20 and 40 is released. As will be described below, both of the rims 20 and 40 are fixed by an engaging mechanism 76.

As shown in FIG. 1, the body unit 60 has a lower spindle 62 that is rotatably supported on a base (support) 61, and an elevating mechanism 63 and fixing mechanisms 64 mounted on the base 61.

Figure 15:
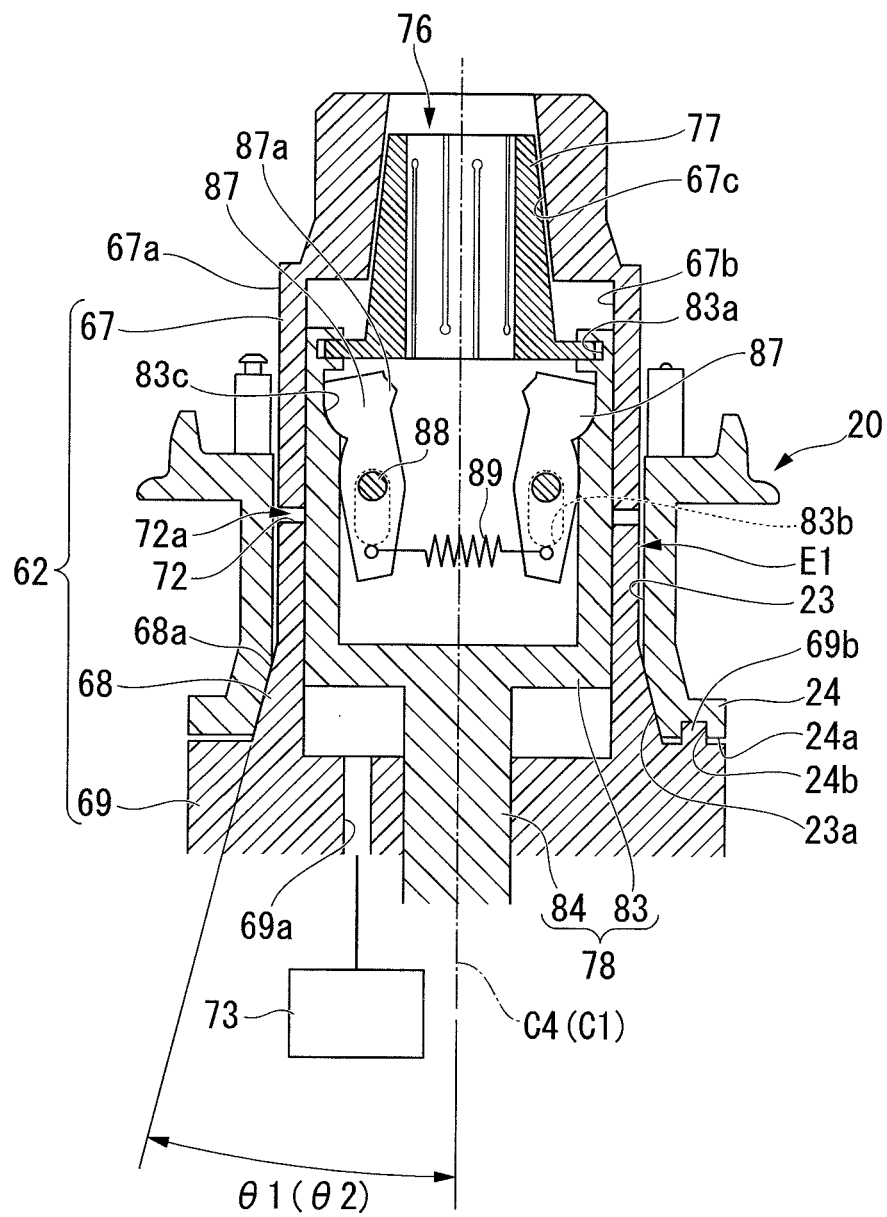
FIG. 15 is a cross-sectional view when an engaging mechanism of the tire uniformity measuring apparatus is in a standby state.

As shown in FIG. 15, the lower spindle 62 has a tube portion (inserting part) 67 formed in a substantially cylindrical shape, a taper portion 68 provided at a lower end of the tube portion 67, and an enlarged-diameter portion 69 provided at a lower end of the taper portion 68. The taper portion 68 is provided with a machine-side inclined surface 68a whose diameter is enlarged from an outer peripheral surface 67a of the tube portion 67 with being separated from the tube portion 67. The enlarged-diameter portion 69 is set so that an outer diameter thereof is larger than that of the taper portion 68.

An outer diameter of the tube portion 67 is set so as to allow the lower through hole 23 of the lower rim 20 and the upper through hole 43 of the upper rim 40 to be inserted.

As shown in FIG. 2, several dimensions are defined.

A length (bead diameter) from the tube portion 67 to a fitting surface of the tire T is defined as D, and a length of the direction of the axis C1 of the lower through hole 23 whose rim-side inclined surface 23a is excluded is defined as M. A distance between the inner circumferential surface of the lower through hole 23 and the tube portion 67 is defined as Δd, and a slope of the lower rim 20 is defined as Δa.

A relation between the slope Δa, the length D, the length M, and the distance Δd is tentatively indicated by formula (1).

$$\Delta a = (\Delta d \times D)/M \quad (1)$$

To limit the slope Δa to be equal to or less than a predetermined value, the distance Δd may be set to, for instance, 0.005 mm to 0.01 mm.

As shown in FIG. 15, a passage of the tube portion 67 is configured so that a lower side thereof becomes a large diameter portion 67b having a constant inner diameter and an upper side thereof becomes a small diameter portion 67c having a smaller inner diameter than the large diameter portion 67b. The small diameter portion 67c is formed in such a manner that the inner diameter thereof is reduced as it goes upward. The tube portion 67 is provided with a hole portion 72. The hole portion 72 has an opening 72a in an outer peripheral surface 67a of the tube portion 67, and communicates with the large diameter portion 67b.

The large diameter portion 67b is provided with a hole portion (not shown) for the tire which is used to supply air between the lower rim 20 and the upper rim 40 when the rim assembly 10 is mounted on the lower spindle 62, to supply air between the lower rim 20 and the upper rim 40.

The hole portion 72 may be used to supply a lubricant from an exterior of the lower spindle 62 into the large diameter portion 67b when the rim assembly 10 is not mounted on the lower spindle 62.

As will be described below, the opening 72a is provided at a position facing the inner circumferential surface of the lower rim 20 when the rim-side inclined surface 23a is brought into contact with the machine-side inclined surface 68a.

The machine-side inclined surface 68a is formed in a shape of an outer surface of a truncated cone whose central axis is an axis C4 of the lower spindle 62. An angle θ1 between the axis C4 and the machine-side inclined surface 68a is set to be equal to an angle θ2 between the axis C1 of the lower rim 20 and the rim-side inclined surface 23a. The enlarged-diameter portion 69 is provided with a vent hole 69a communicating with the large diameter portion 67b. The vent hole 69a is connected to an air source (air supply) 73, and thus compressed air (gas) can be supplied into the large diameter portion 67b through the vent hole 69a. The air supplied into the large diameter portion 67b is discharged to the outside through the hole portion for the tire.

An upper surface of the enlarged-diameter portion 69 is provided with a positioning convex portion 69b engaged with the aforementioned positioning hole portion 24b.

The state in which the lower rim 20 is mounted on the lower spindle 62 will be described.

As shown in FIG. 15, the lower through hole 23 of the lower rim 20 is inserted around the lower spindle 62, and the lower rim 20 is lowered while the direction around the axis C1 of the lower rim 20 is adjusted.

The positioning hole portion 24b is engaged with the positioning convex portion 69b, and the rim-side inclined surface 23a of the lower rim 20 is brought into contact with the machine-side inclined surface 68a of the lower spindle 62. Then, the rim-side inclined surface 23a comes into surface contact with the machine-side inclined surface 68a.

Here, a minute gap E1 is formed between the outer peripheral surface 67a of the tube portion 67 and the inner circumferential surface of the lower through hole 23, and the second collar portion 24 is kept separated from the enlarged-diameter portion 69. The lower rim 20 is mainly supported on the machine-side inclined surface 68a, and is prevented from being inclined by the tube portion 67.

When the upper through hole 43 of the upper rim 40 is further inserted around the lower spindle 62, a minute gap is formed between the outer peripheral surface 67a of the tube portion 67 and the inner circumferential surface of the upper through hole 43.

The engaging mechanism 76 is mounted in the lower spindle 62. The engaging mechanism 76 is a known mechanism disclosed in, for instance, Japanese Patent No. 3040514. The engaging mechanism 76 is made up of a taper sleeve 77 and a hook operating rod 78 connected to the taper sleeve 77 as main components.

Figure 16:
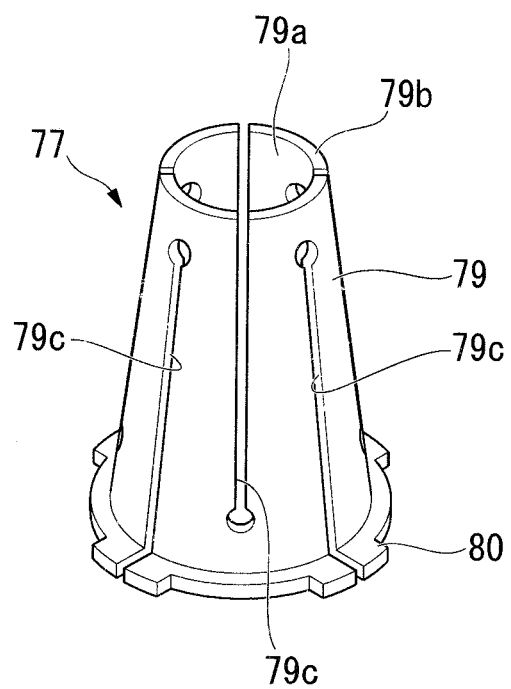
FIG. 16 is a perspective view of a taper sleeve mounted in the lower spindle.

As shown in FIG. 16, the taper sleeve 77 has a body 79 formed in an approximately truncated cone shape, and a flange portion 80 provided on an outer peripheral surface of a lower end of the body 79.

The body 79 is provided with a through-hole 79a in the direction of the axis C4. A sidewall 79b of the body 79 is provided with a plurality of slits 79c that pass through the sidewall 79b in a thickness direction and extend along the axis C4 of the body 79. The taper sleeve 77 receives a compressed force in a radial direction. Thereby, a width of each slit 79c can be narrowed to reduce an inner diameter of the through-hole 79a.

As shown in FIG. 15, the hook operating rod 78 has a cylindrical portion 83 formed in a bottomed tube shape, and a shaft-like member 84 that is fixed to the bottom of the cylindrical portion 83 and extends downward. An upper end of an inner circumferential surface of the cylindrical portion 83 is provided with an annular groove 83a engaged with the flange portion 80 of the taper sleeve 77. The cylindrical portion 83 is provided with a pair of long holes 83b that pass through a wall thereof using a vertical direction as a long axis.

A cylinder (not shown) is connected to a lower end side of the shaft-like member 84 so as to allow the hook operating rod 78 to move up and down.

A pair of hooks 87 is disposed inside the cylindrical portion 83 so as to face each other across the axis C4. Opposite ends of pins 88 acting as fulcrums of the hooks 87 are fixed to the lower spindle 62 through the long holes 83b of the cylindrical portion 83. A spring 89 is connected to lower ends of the hooks 87, and the lower ends of the hooks 87 are biased so as to approach each other.

An engaging hook 87a protrudes from a region of an upper end of each hook 87, wherein the region is directed to the axis C4.

In a standby state shown in FIG. 15, the engaging mechanism 76 is configured so that the hook operating rod 78 thereof moves downward with respect to the lower spindle 62. A slight gap is formed between the outer peripheral surface of the taper sleeve 77 and the small diameter portion 67c of the tube portion 67 in their natural state. Furthermore, the hooks 87 are biased, and thereby the upper ends of the hooks 87 enter cutouts 83c formed in the inner circumferential surface of the cylindrical portion 83, and a distance between the engaging hooks 87a is spaced apart from an outer diameter of an upper rim shaft 112 to be described below.

Figure 17:
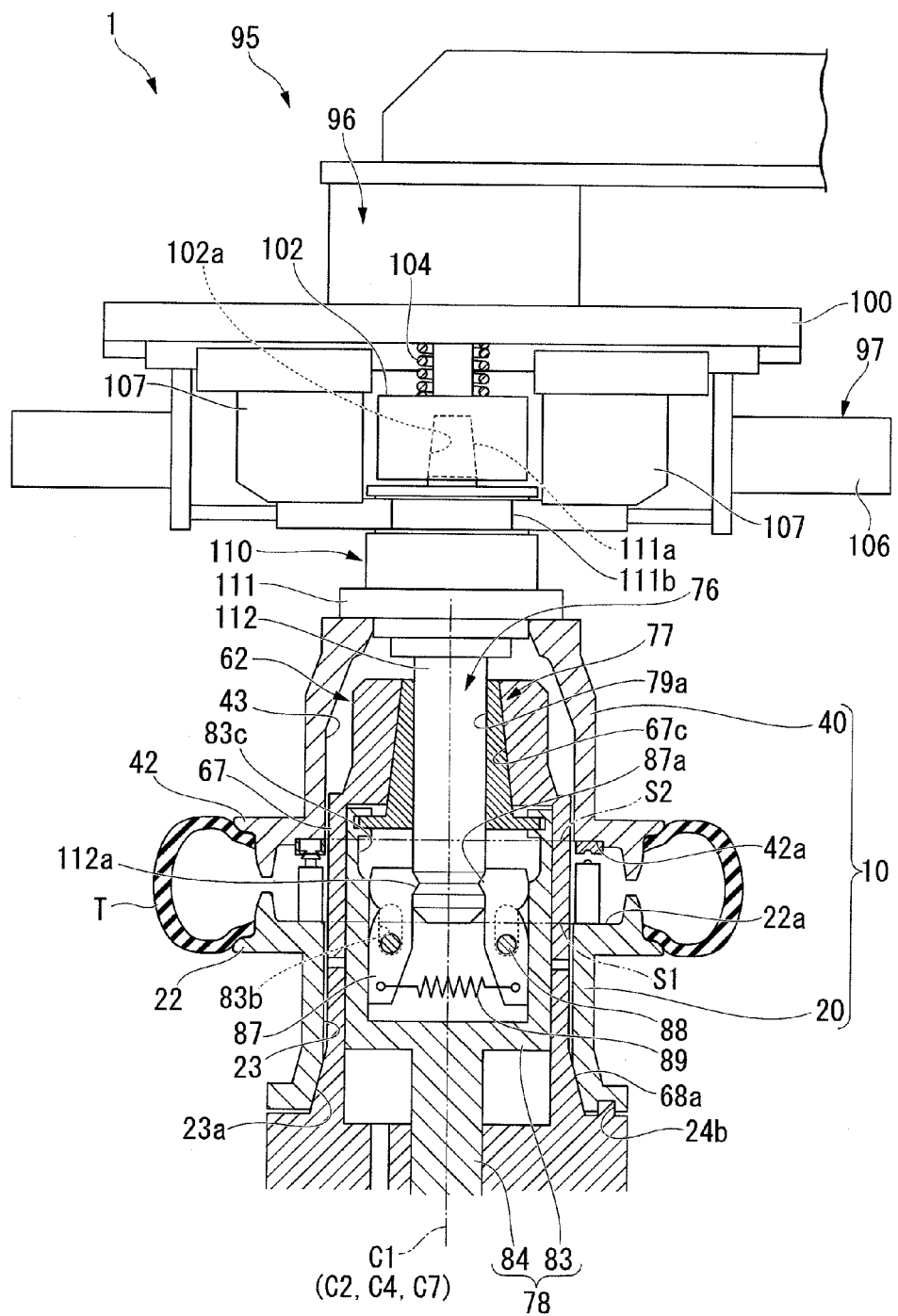
FIG. 17 is a cross-sectional view when the engaging mechanism is in an engagement state.

On the other hand, in a fixing state shown in FIG. 17, the hook operating rod 78 of the engaging mechanism 76 moves upward. The taper sleeve 77 moves upward, and is pushed into the small diameter portion 67c. Thereby, the taper sleeve 77 is compressed in a radial direction, and an inner diameter of the through-hole 79a is reduced. The hook operating rod 78 moves upward relative to the hooks 87. Thereby, the upper ends of the hooks 87 are pushed out of the cutouts 83c, and the distance between the engaging hooks 87a is reduced. In this case, since the pins 88 move in the long holes 83b, the pins 88 do not restrain the movement of the hook operating rod 78.

In the lower spindle 62 is supported on the base 61 by a bearing (not shown). The lower spindle 62 can be rotated around the axis C4 by a servomotor (rotating part) 90 shown in FIG. 1.

The elevating mechanism 63 has a frame 93 fixed to the base 61, and a rim lifting and lowering device 95 mounted on the frame 93 via a ball screw 94. The rim lifting and lowering device 95 can be displaced in a vertical direction by the ball screw 94.

Figure 18:
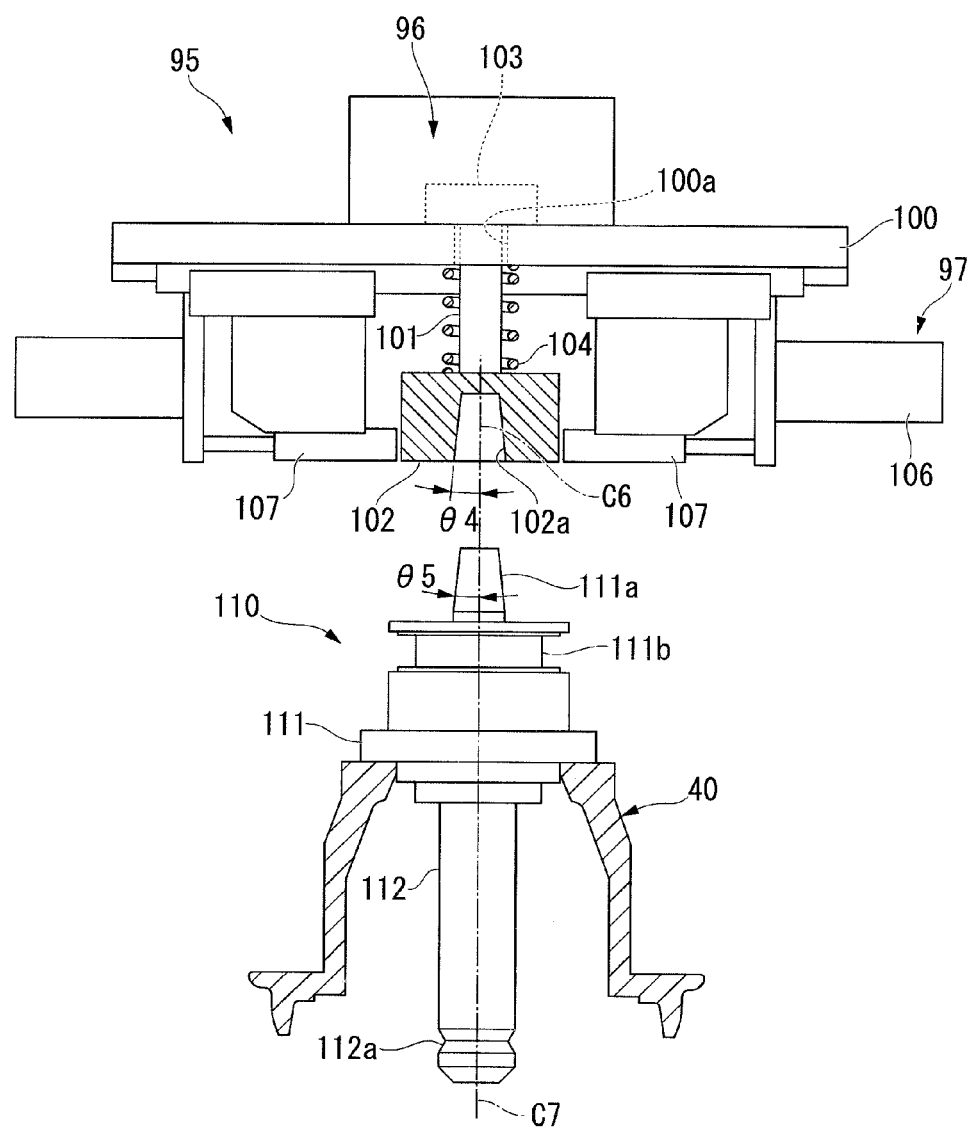
FIG. 18 is a cross-sectional view describing a state in which a connecting adapter is demounted from a rim lifting and lowering device of the tire uniformity measuring apparatus.

As shown in FIG. 18, the rim lifting and lowering device 95 has a positioning portion 96 and a chuck portion (regulating part) 97.

The positioning portion 96 has a rod 101 inserted into a through-hole 100a formed in a supporting plate 100, a positioning member 102 fixed to a lower end of the rod 101 and having approximately a disc shape, and a supporting member 103 fixed to an upper end of the rod 101.

A lower surface of the positioning member 102 is provided with a second machine-side inclined surface 102a whose diameter is enlarged as it goes downward. The second machine-side inclined surface 102a is formed in a shape of an inner surface of a truncated cone, and is exposed toward an axis C6 of the positioning member 102. In other words, the second machine-side inclined surface 102a is directed toward the axis C6.

A spring 104 into which the rod 101 is inserted is latched on a lower surface of the supporting plate 100 and an upper surface of the positioning member 102, and generates a force adapted to separate the supporting plate 100 and the positioning member 102 from each other regardless of a distance between the supporting plate 100 and the positioning member 102.

An outer diameter of the supporting member 103 is set to be greater than an outer diameter of the through-hole 100a. The supporting member 103 is latched on an upper surface of the supporting plate 100.

The chuck portion 97 has an air cylinder 106 and a pair of gripping members 107 that are slidable in a direction parallel to a horizontal plane.

The positioning portion 96 and the chuck portion 97 described above are detachably mounted on a connecting adapter 110 attached to the upper rim 40.

The connecting adapter 110 has an adapter body 111 detachably mounted on the upper rim 40 by bolts (not shown), and an upper rim shaft 112 fixed to a lower portion of the adapter body 111. The adapter body 111 and the upper rim shaft 112 may be integrally formed, or joined after being formed separately.

An upper portion of the adapter body 111 is provided with a second rim-side inclined surface 111a. The second rim-side inclined surface 111a is formed in a shape of a side surface of a truncated cone, and is exposed to the opposite side of an axis C7 side of the connecting adapter 110. In other words, the second rim-side inclined surface 111a is exposed to the opposite side of the axis C7 side.

An angle θ4 between the axis C6 and the second machine-side inclined surface 102a described above is set to be equal to an angle θ5 between the axis C7 and the second rim-side inclined surface 111a. An outer peripheral surface of the adapter body 111 is provided with an engaging groove 111b with which the gripping members 107 are engaged.

An outer peripheral surface of a lower end of the upper rim shaft 112 is provided with an engaging concave portion 112a with which the aforementioned engaging hooks 87a are engaged.

The connecting adapter 110 is mounted on the rim lifting and lowering device 95 in the following order.

A space between the pair of gripping members 107 is widened by the air cylinder 106 in advance.

As shown in FIG. 17, the adapter body 111 is inserted into the positioning member 102 so as to bring the second rim-side inclined surface 111a into contact with the second machine-side inclined surface 102a. The connecting adapter 110 is displaced toward the supporting plate 100 against a biasing force of the spring 104. In this state, the gripping members 107 are engaged with the engaging groove 111b of the adapter body 111.

Since the connecting adapter 110 is engaged by the gripping members 107 subjected to positioning adjustment so as to maintain a relative center, the connecting adapter 110 is centered in a direction of the axis C7 thereof and a direction parallel to the horizontal plane. Furthermore, the second rim-side inclined surface 111a is biased downward by the second machine-side inclined surface 102a. Thereby, the connecting adapter 110 is reliably positioned by a direction parallel to the horizontal plane orthogonal to the axis C7.

Figure 19:
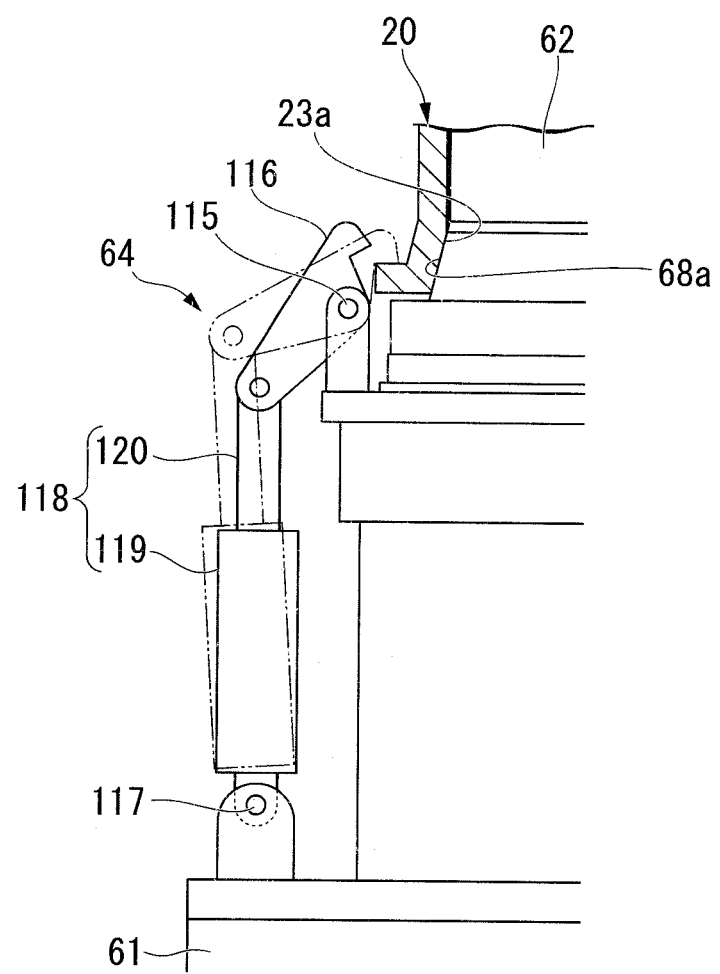
FIG. 19 is a font view of a fixing mechanism of the tire uniformity measuring apparatus.

As shown in FIGS. 1 and 19, a pair of fixing mechanism 64 is mounted on the base 61 with the lower spindle 62 sandwiched therebetween.

Each fixing mechanism 64 has a hook 116 supported to be rotatable around a shaft member 115 mounted on the base 61, and a piston part 118 whose base end is supported to be rotatable around a shaft member 117 mounted on the base 61.

The piston part 118 allows a piston rod 120 to move backward and forward relative to a cylinder 119 connected to the shaft member 117. A tip of the piston rod 120 is rotatably connected to a base end of the hook 116.

By the piston rod 120 of the fixing mechanism 64 being pushed out of the cylinder 119, a state of the lower rim 20 mounted on the lower spindle 62 becomes a fixing state in which the hook 116 is fixed on the machine-side inclined surface 68a (indicated by a two-dot chain line in FIG. 19).

On the other hand, the piston rod 120 is pulled back to the cylinder 119, and thereby a state of the fixing mechanism 64 becomes a released state in which the fixture is released.

In this way, the fixing mechanism 64 can switch between the fixing state and the released state.

As shown in FIG. 1, at the base 61, a load wheel 124 is disposed on a rail 123. The load wheel 124 travels on the rail 123. Thereby, the load wheel 124 can move toward or away from the lower spindle 62.

In the rim change unit 130, a rotating base 131 travels on a rail 132, and can move toward or away from the lower spindle 62. An upper portion of the rotating base 131 is provided with a rotating shaft 133. A plurality of stocker frames 134 are connected to the rotating shaft 133. The rotating shaft 133 causes the stocker frames 134 to be rotated around an axis thereof. Thereby, the rotating shaft 133 allows the rim assembly 10 disposed on rim pedestals 135 of the stocker frames 134 to move toward or away from the lower spindle 62.

Positioning convex portions 69b are formed on the respective stocker frame 134 (see FIG. 21), and a phase around the axis C1 of the rim assembly 10 disposed on the stocker frames 134 is positioned.

An operation of the tire measuring apparatus 1 will be described.

Exchange of the rim assembly 10 mounted on the body unit 60, and the case where the tire T is mounted on the rim assembly 10 to perform measurement will be described. These operations are performed based on the control of a control unit.

Exchange of the rim assembly 10 will be described.

As shown in FIG. 1, the lower rim 20 and the upper rim 40 are separated. The lower rim 20 is mounted on the lower spindle 62, and the connecting adapter 110 fixed to the upper rim 40 is mounted on the rim lifting and lowering device 95 and is displaced upward.

In this case, the engaging mechanism 76 inside the lower spindle 62 is in a standby state, and the fixing mechanisms 64 are in a released state. The load wheel 124 and the rotating base 131 are kept separated from the lower spindle 62.

Figure 20:
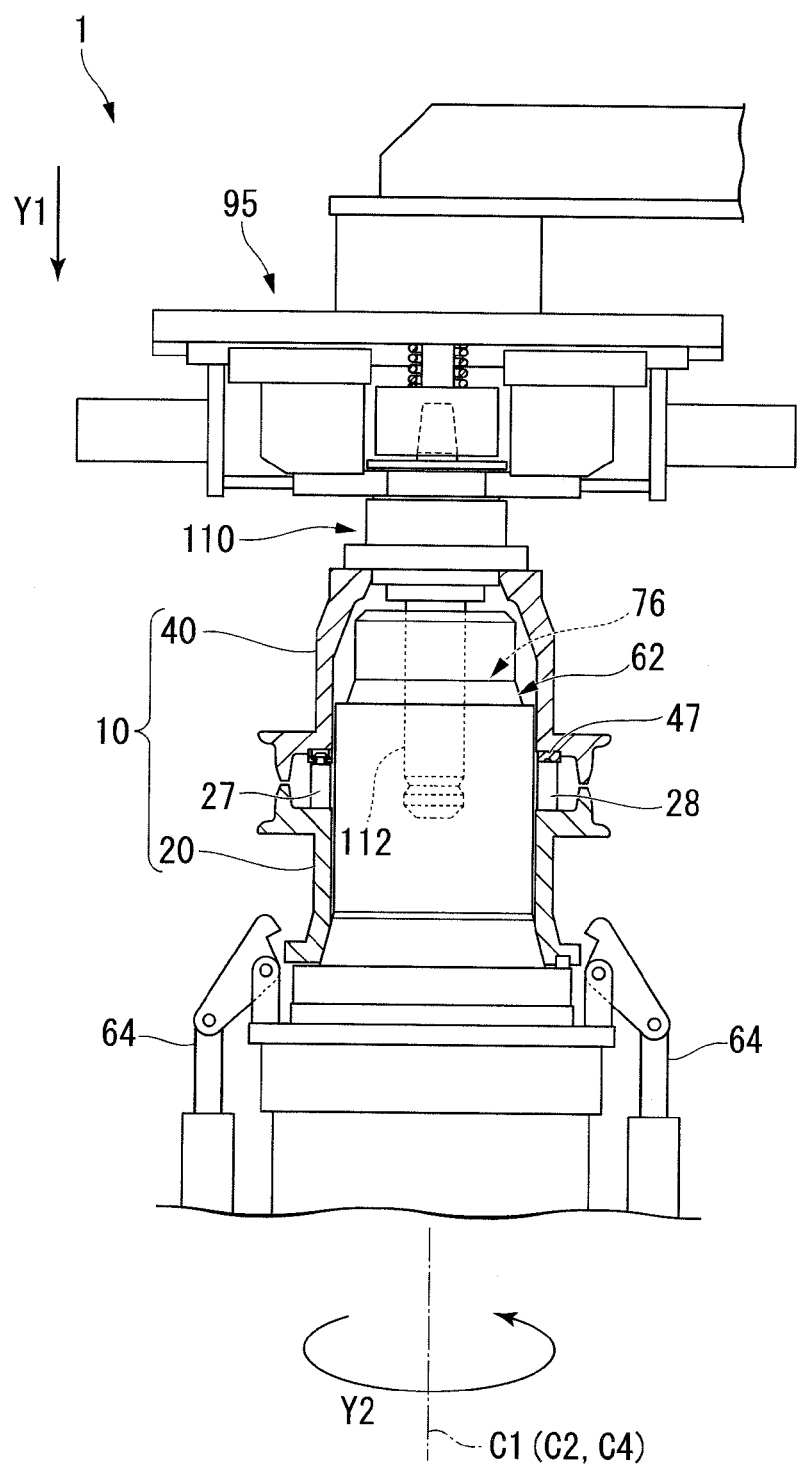
FIG. 20 is a view describing an operation of exchanging the rim assembly in the tire uniformity measuring apparatus.

As indicated by an arrow Y1 of FIG. 20, the rim lifting and lowering device 95 is lowered to move the upper rim 40 downward from this state, and the upper rim 40 is caused to overlap the lower rim 20.

In this case, a phase relation between the rims 20 and 40 is as shown in FIGS. 8 and 9. In a state in which the stand receiving portions 47 come into contact with the stands 28, the convex portions 28b are engaged with the guide concave portions 55. Further, the projection portions 30 of the pins 27 are inserted into the insertion opening portions 48.

The upper rim shaft 112 is inserted into the engaging mechanism 76. Here, since the engaging mechanism 76 is in the standby state, the engaging hooks 87a of the hooks 87 are not engaged with the engaging concave portion 112a of the upper rim shaft 112.

Next, as indicated by an arrow Y2 of FIG. 20, the lower rim 20 is rotated around the axis C1 along with the lower spindle 62 in a counterclockwise direction by the servomotor 90. In this case, the phase relation between the rims 20 and 40 is as shown in FIGS. 10 and 11. Due to the rotation of the lower rim 20, the stands 28 begin to come into contact with the stand receiving portion 47, and the protruding portions 51 of the upper rim 40 are disposed inside the groove portions 29 of the pins 27. The pin receiving portion 46 and the pins 27 are engaged, and the lower rim 20 and the upper rim 40 are integrated. The convex portions 28b are engaged with the concave portions 54.

Subsequently, as indicated by an arrow Y3 of FIG. 21, the rim lifting and lowering device 95 is lifted to move the rim assembly 10 in which the rims 20 and 40 are integrated upward. Here, as shown in FIG. 14, the pin receiving portion 46 of the upper rim 40 supports the pins 27, and the lower rim 20 is kept hung from the upper rim 40.

Figure 21:
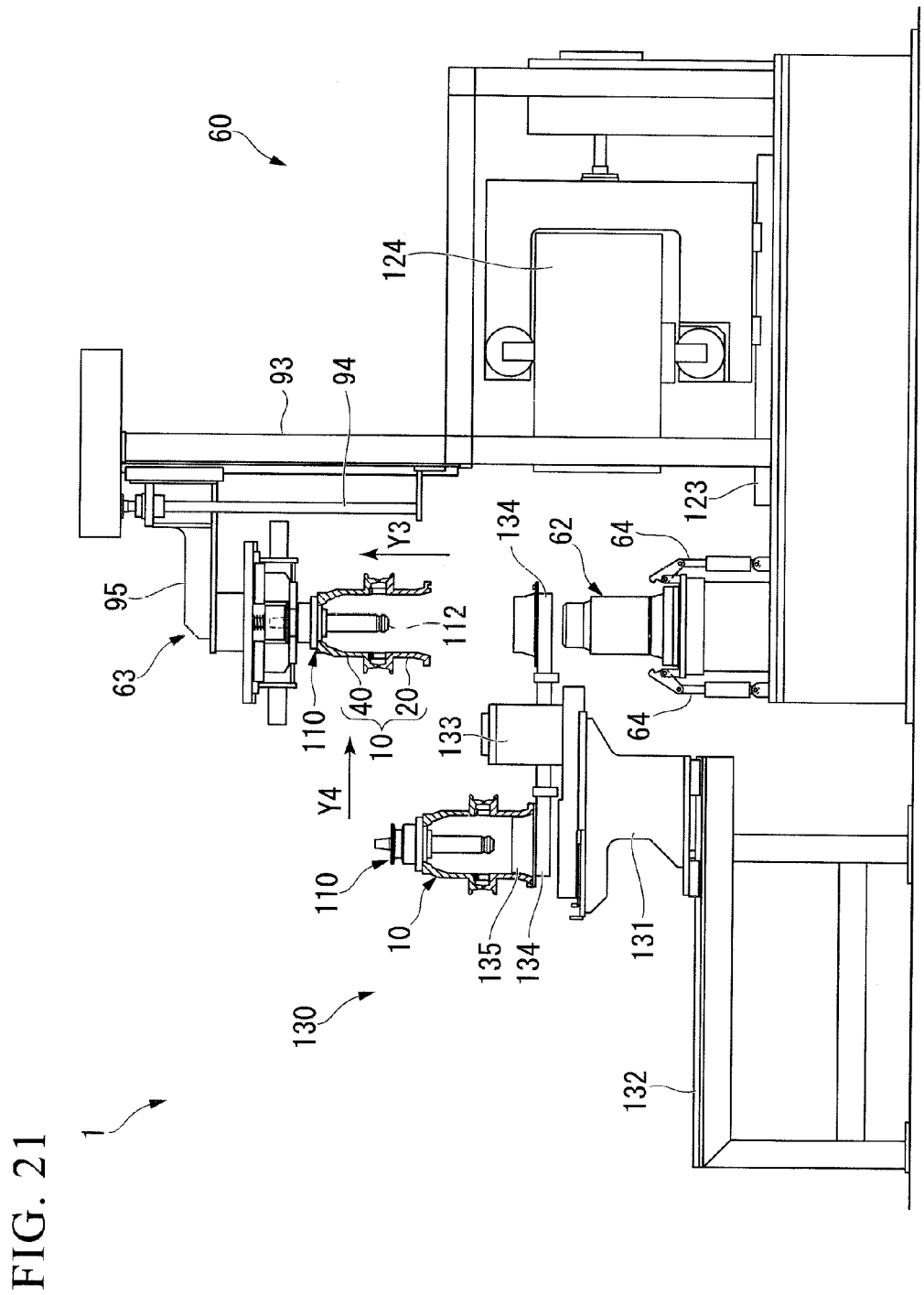
FIG. 21 is a view describing an operation of exchanging the rim assembly in the tire uniformity measuring apparatus.

As indicated by an arrow Y4 of FIG. 21, the rim change unit 130 is caused to approach the lower spindle 62. In this case, the stocker frame 134 on which the rim assembly 10 is not disposed is disposed below the rim assembly 10 supported by the rim lifting and lowering device 95.

Figure 22:
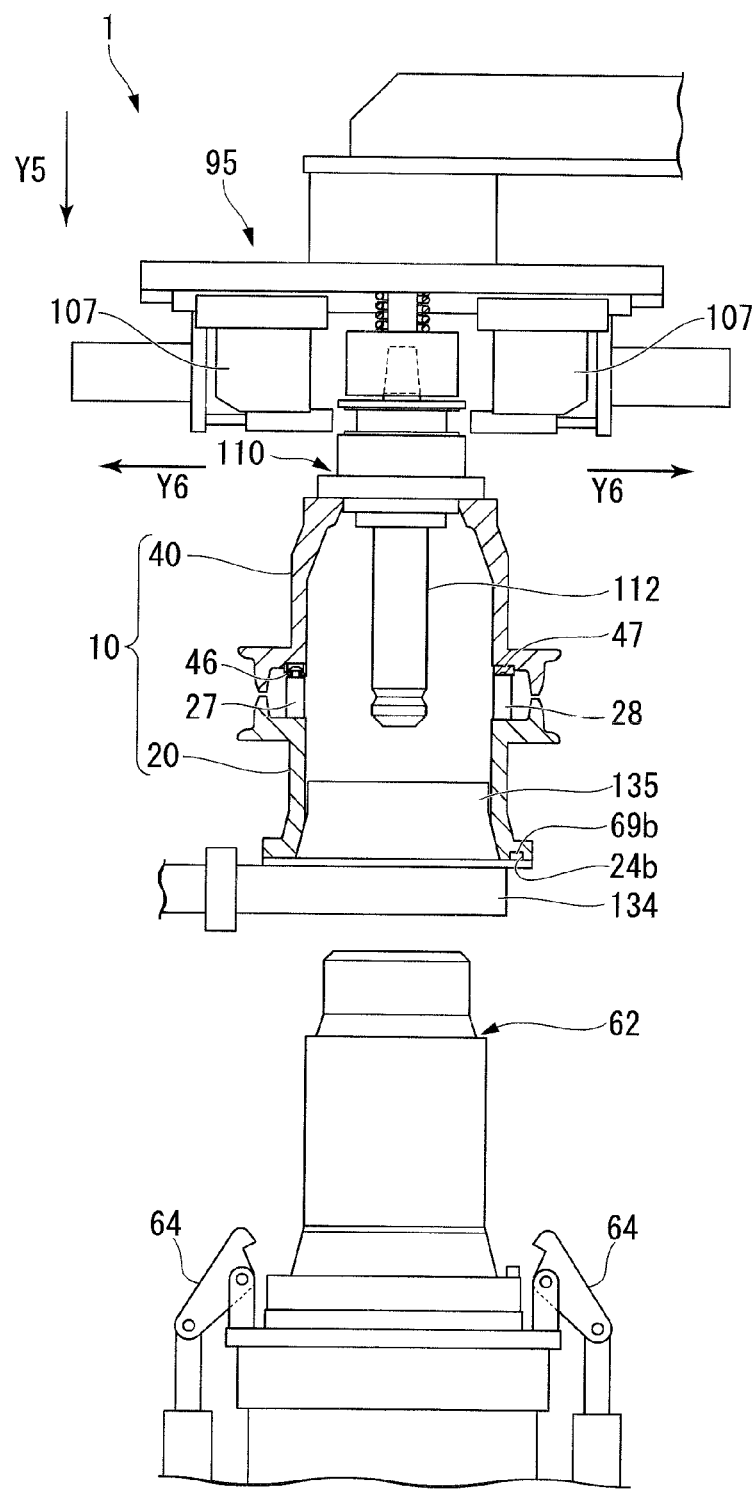
FIG. 22 is a view describing an operation of exchanging the rim assembly in the tire uniformity measuring apparatus.
Figure 23:
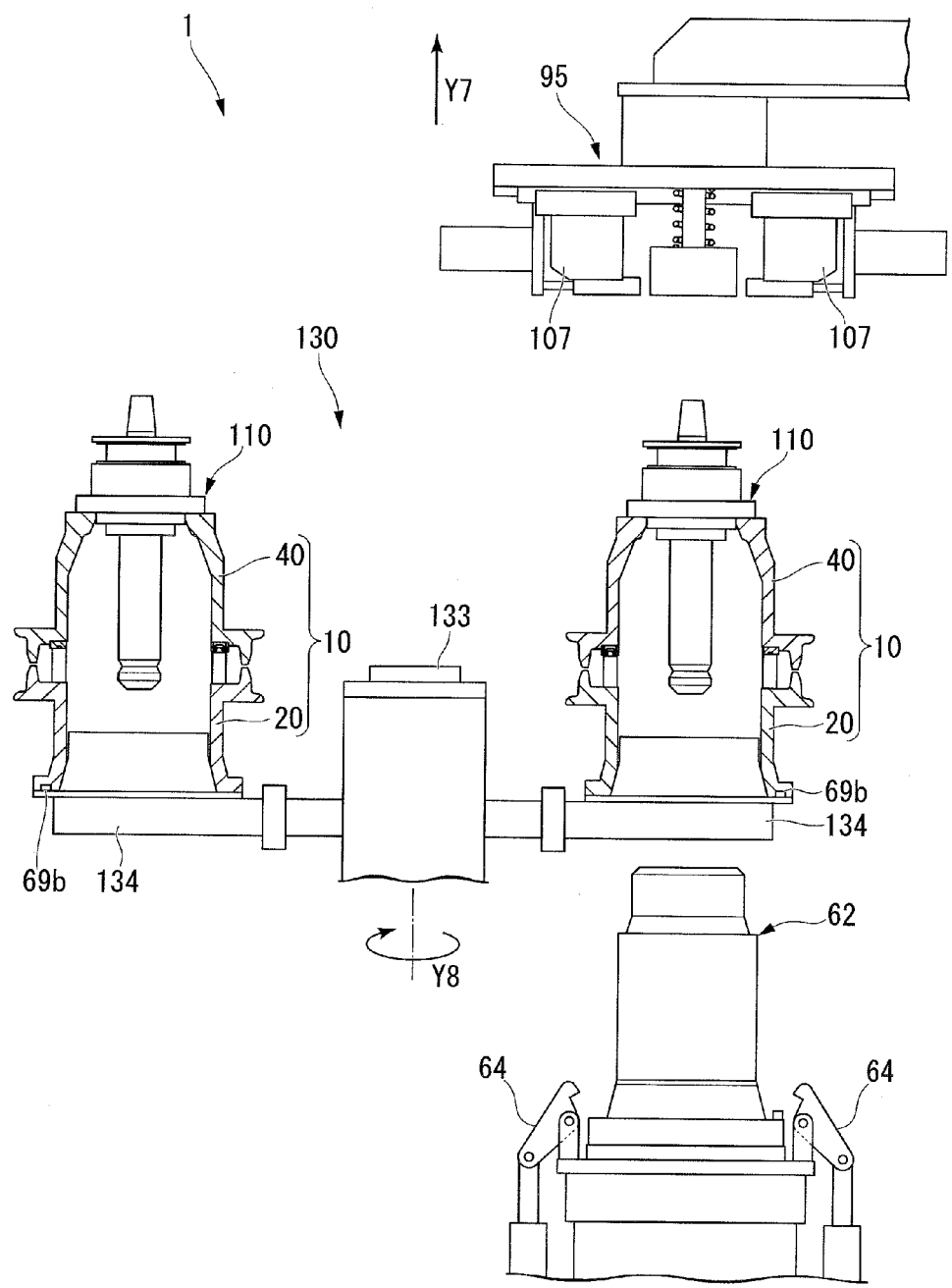
FIG. 23 is a view describing an operation of exchanging the rim assembly in the tire uniformity measuring apparatus.

Next, as indicated by an arrow Y5 of FIG. 22, the rim lifting and lowering device 95 is lowered, and the rim assembly 10 on which the connecting adapter 110 is mounted is disposed on the rim pedestal 135 above the stocker frame 134. In this case, the positioning hole portion 24b of the lower rim 20 is engaged with the positioning convex portion 69b protruding above the stocker frame 134.

As a result, the stand receiving portions 47 come into contact with the stands 28, and the lower rim 20 supports the upper rim 40. Here, the pins 27 and the pin receiving portions 46 do not interfere with each other, and the pins 27 can be prevented from being damaged without supporting a load of the upper rim 40.

When the rim assembly 10 is disposed on the stocker frame 134, as indicated by an arrow Y6 of FIG. 22, the pair of gripping members 107 supporting the connecting adapter 110 are displaced to be separated from each other, and the rim assembly 10 is demounted from the rim lifting and lowering device 95. As indicated by an arrow Y7 of FIG. 23, the rim lifting and lowering device 95 is lifted and separated from the rim change unit 130.

Afterwards, as indicated by an arrow Y8, the stocker frame 134 is rotated around the axis of the rotating shaft 133, and another type of rim assembly 10 different from the rim assembly 10 previously mounted on the body unit 60 is located below the rim lifting and lowering device 95.

Figure 24:
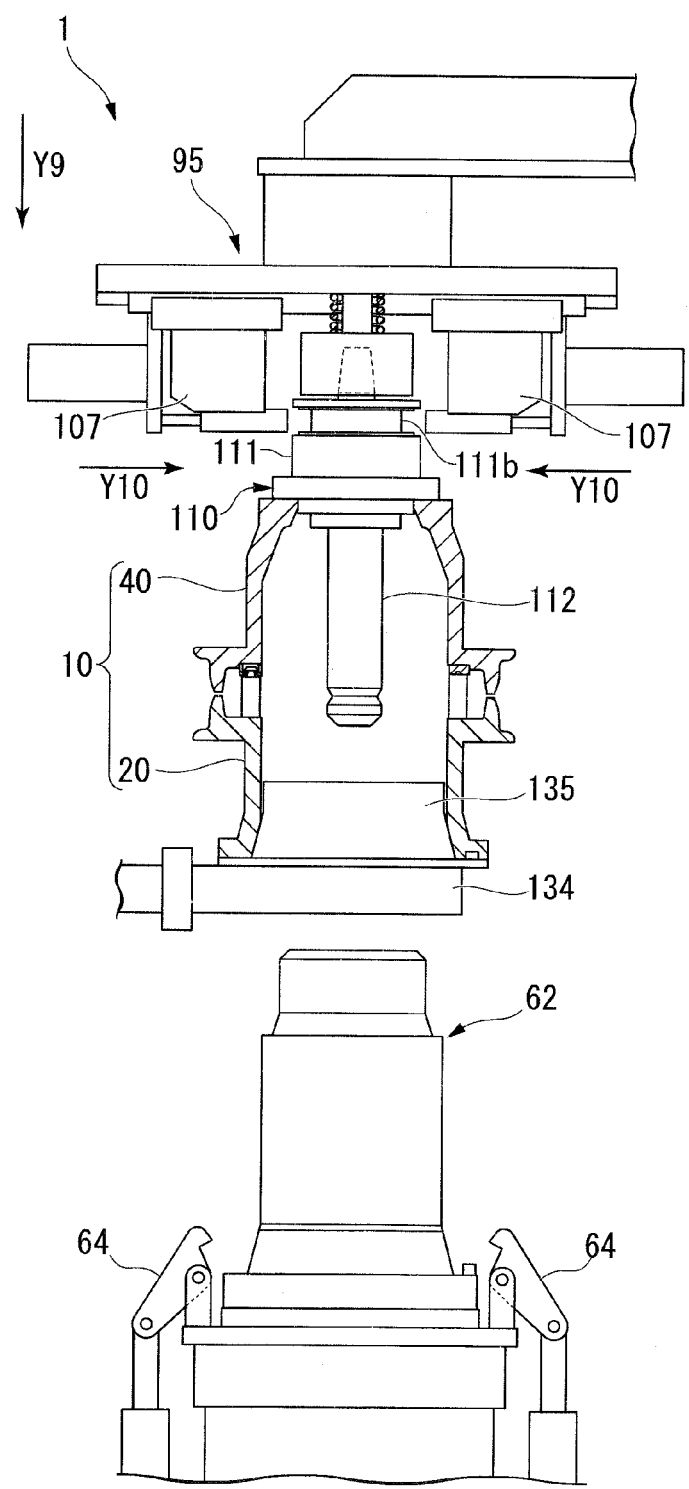
FIG. 24 is a view describing an operation of exchanging the rim assembly in the tire uniformity measuring apparatus.

Next, as indicated by an arrow Y9 of FIG. 24, the rim lifting and lowering device 95 is lowered to displace the gripping members 107 so as to interpose the engaging groove 111b of the adapter body 111. As indicated by an arrow Y10, the gripping members 107 are caused to approach each other, and the gripping members 107 are engaged with the engaging groove 111b. In this case, the lower rim 20 and upper rim 40 of the rim assembly 10 are kept engaged with each other.

Figure 25:
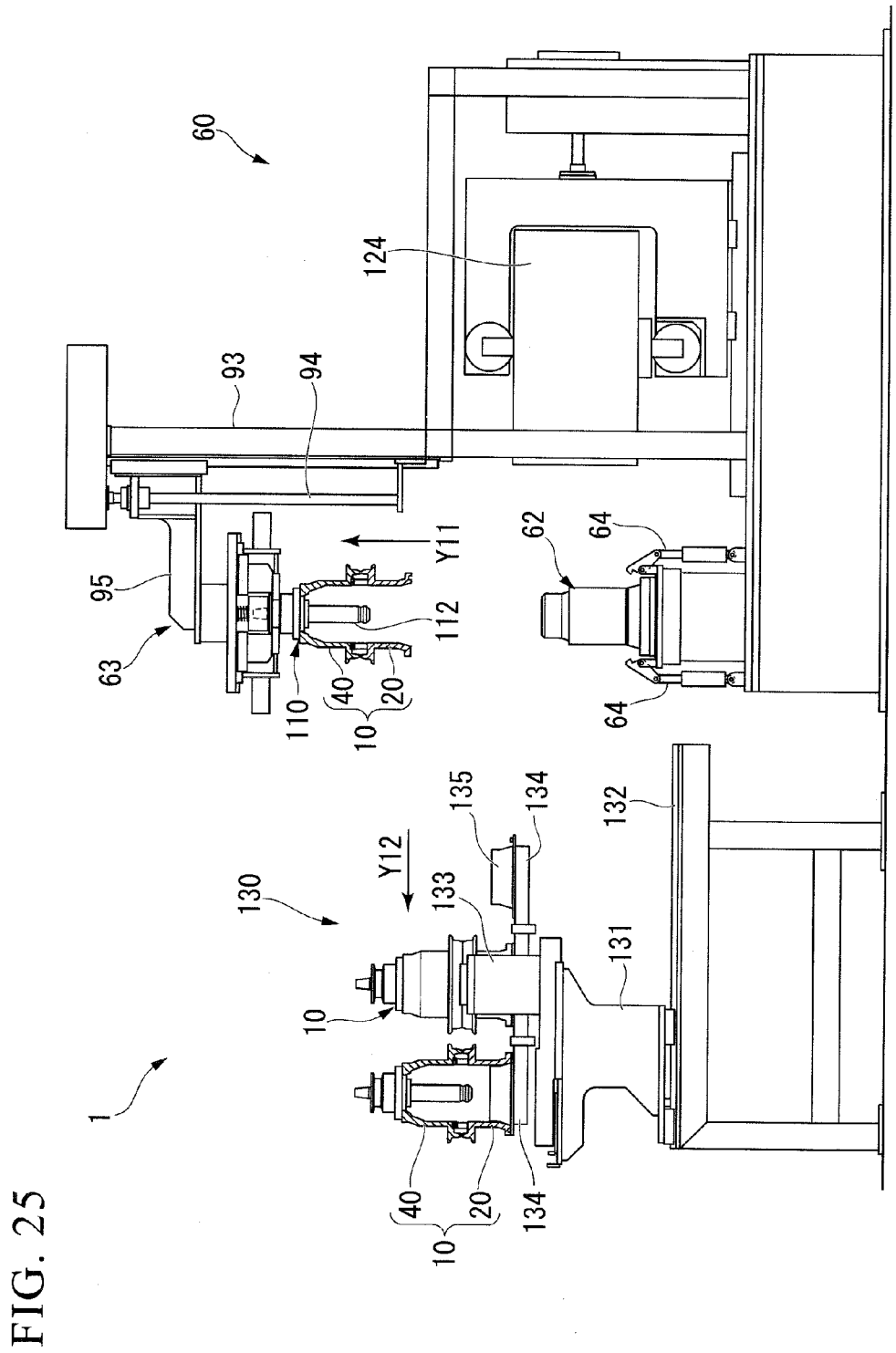
FIG. 25 is a view describing an operation of exchanging the rim assembly in the tire uniformity measuring apparatus.

As indicated by an arrow Y11 of FIG. 25, the rim lifting and lowering device 95 engaged with the rim assembly 10 is lifted. As indicated by an arrow Y12, the rim change unit 130 is separated from the lower spindle 62, and the stocker frame 134 of the rim change unit 130 is retracted from above the lower spindle 62.

Figure 26:
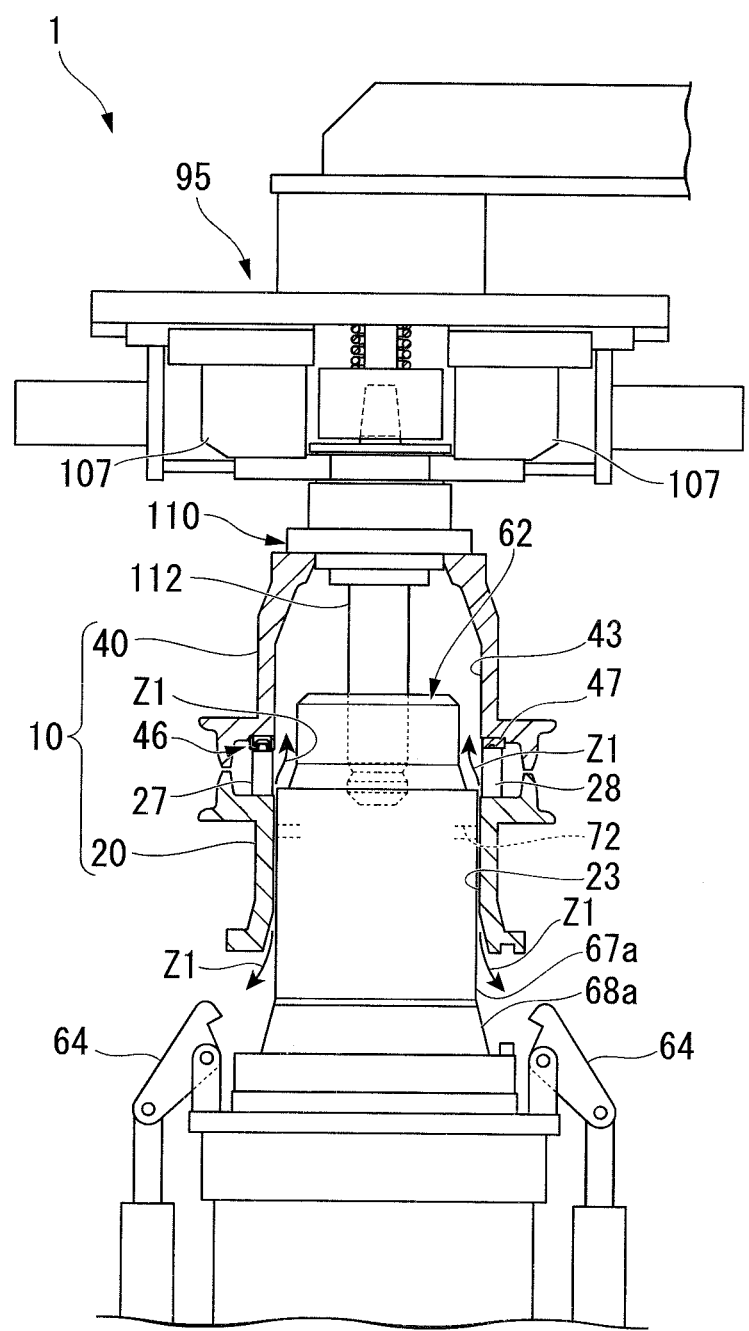
FIG. 26 is a view describing an operation of exchanging the rim assembly in the tire uniformity measuring apparatus.

Subsequently, as shown in FIG. 26, the rim lifting and lowering device 95 is lowered to mount the rim assembly 10 on the lower spindle 62. In this case, the lower spindle 62 is inserted into the lower through hole 23 of the lower rim 20 and the upper through hole 43 of the upper rim 40.

However, as described above, since the gap between the lower through hole 23 and the lower spindle 62 is small, the lower spindle 62 may not be smoothly inserted into the lower through hole 23. Even in this case, the upper rim 40 is pushed downward by the rim lifting and lowering device 95. Thereby, the stands 28 of the lower rim 20 are pressed downward by the stand receiving portions 47 of the upper rim 40, and the lower spindle 62 is inserted into the lower through hole 23.

Further, after the rim assembly 10 is demounted, dust may be attached to the outer peripheral surface 67a or the machine-side inclined surface 68a of the lower spindle 62. In this case, in a state in which the inner circumferential surface of the lower through hole 23 is caused to face the opening 72a, air is supplied by the air source 73, and is discharged from the opening 72a. Thereby, as indicated by an arrow Z1, the air flows downward and upward, and the dust is blown off.

Figure 27:
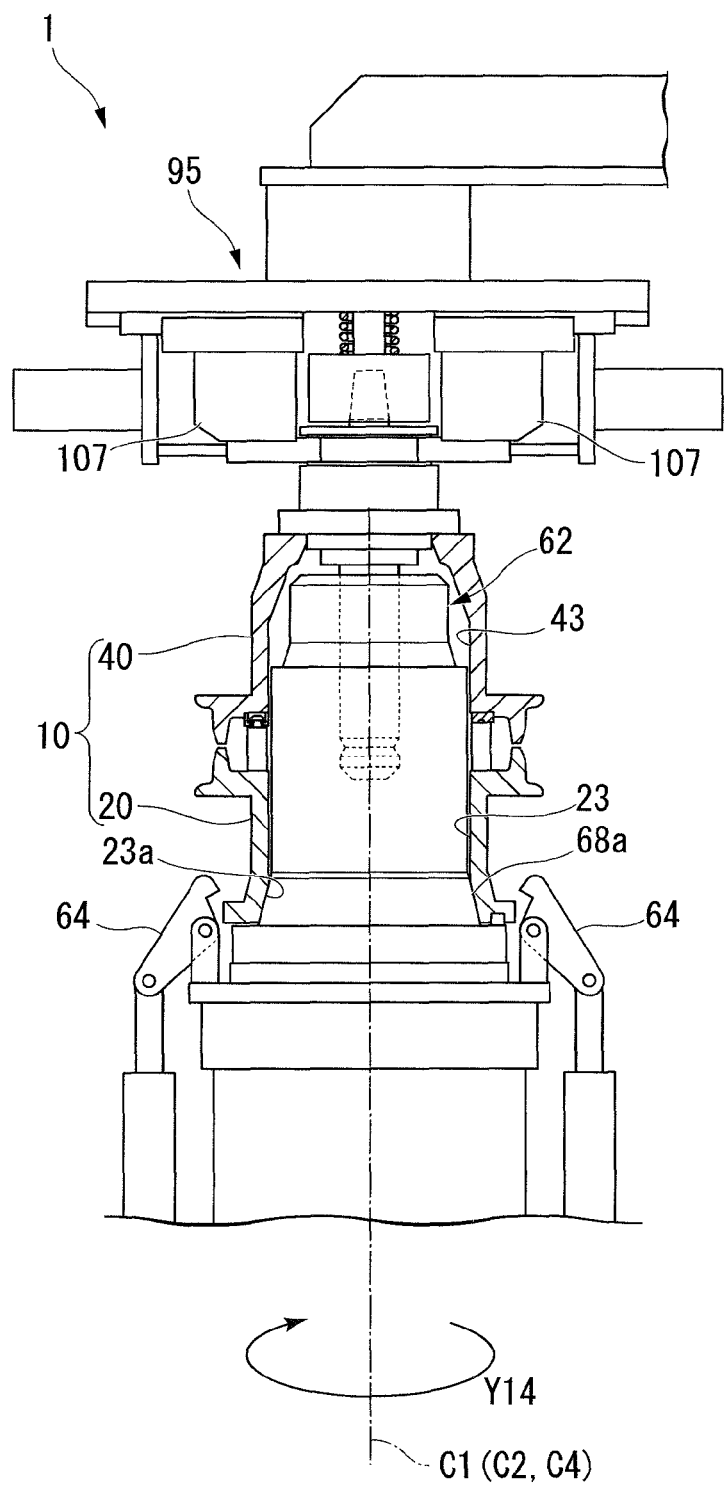
FIG. 27 is a view describing an operation of exchanging the rim assembly in the tire uniformity measuring apparatus.

As shown in FIG. 27, the rim lifting and lowering device 95 is further lowered to bring the rim-side inclined surface 23a of the lower rim 20 into contact with the machine-side inclined surface 68a of the lower spindle 62. The rim assembly 10 is supported by the machine-side inclined surface 68a.

In this case, since the lower spindle 62 is inserted into each of the lower through hole 23 and the upper through hole 43, both of the rims 20 and 40 are inhibited from being inclined with respect to the axis C4 of the lower spindle 62.

As indicated by an arrow Y14, when viewed from the top, the lower spindle 62 is rotated around the axis C4 in a clockwise direction, and the lower rim 20 is rotated relative to the upper rim 40. Here, the phase relation between the upper rim 40 and the lower rim 20 is as shown in FIGS. 8 and 9. Due to the clockwise rotation of the lower rim 20, the projection portions 30 of the pins 27 reach the insertion opening portions 48. Thereby, the engagement of the pin receiving portions 46 and the pins 27 can be released. That is, as the rim lifting and lowering device 95 is lifted, the pins 27 are separated from the pin receiving portions 46, and the rim assembly 10 can be divided into the lower rim 20 and the upper rim 40 as shown in FIG. 1.

The case where the tire T is mounted on the rim assembly 10 to perform measurement will be described.

As shown in FIG. 17, the tire T is disposed on the collar portion 22 of the lower rim 20 in the state in which the tire measuring apparatus 1 is located as shown in FIG. 1.

The rim lifting and lowering device 95 is lowered up to a predetermined rim width for measuring the tire. In this case, the upper rim shaft 112 is inserted into the through-hole 79a of the taper sleeve 77 of the engaging mechanism 76 and between the pair of hooks 87.

When the hook operating rods 78 are displaced upward, the inner diameter of the through-hole 79a of the taper sleeve 77 is reduced. The upper portion of the upper rim shaft 112 is fixed to the lower spindle 62 via the taper sleeve 77, and the engaging hooks 87a of the hooks 87 are engaged with the engaging concave portion 112a of the upper rim shaft 112. In this way, the engaging mechanism 76 is changed from the standby state to the engagement state, and thus the upper rim shaft 112 is fixed to the lower spindle 62. Thereby, the lower spindle 62, the rim assembly 10, and the connecting adapter 110 are integrated.

Next, the air is supplied by the air source 73, and is discharged from the hole portion (not shown) for the tire. Thereby, the air inside the tire T is caused to approach a predetermined pressure, and the tire T is fitted with both of the rims 20 and 40. In this case, the tire T is pressed against and stuck to the collar portion 22 of the lower rim 20 and the collar portion 42 of the upper rim 40 by the pressure of the air, and the lower rim 20 is also pressed against the machine-side inclined surface 68a.

When the lower spindle 62 is rotated by the servomotor 90, the tire T is rotated around the axis C4 along with the rim assembly 10 and the connecting adapter 110. The load wheel 124 is caused to approach the lower spindle 62 and come into contact with the tire T, and distribution of loads applied to the tire T is measured.

Figure 28:
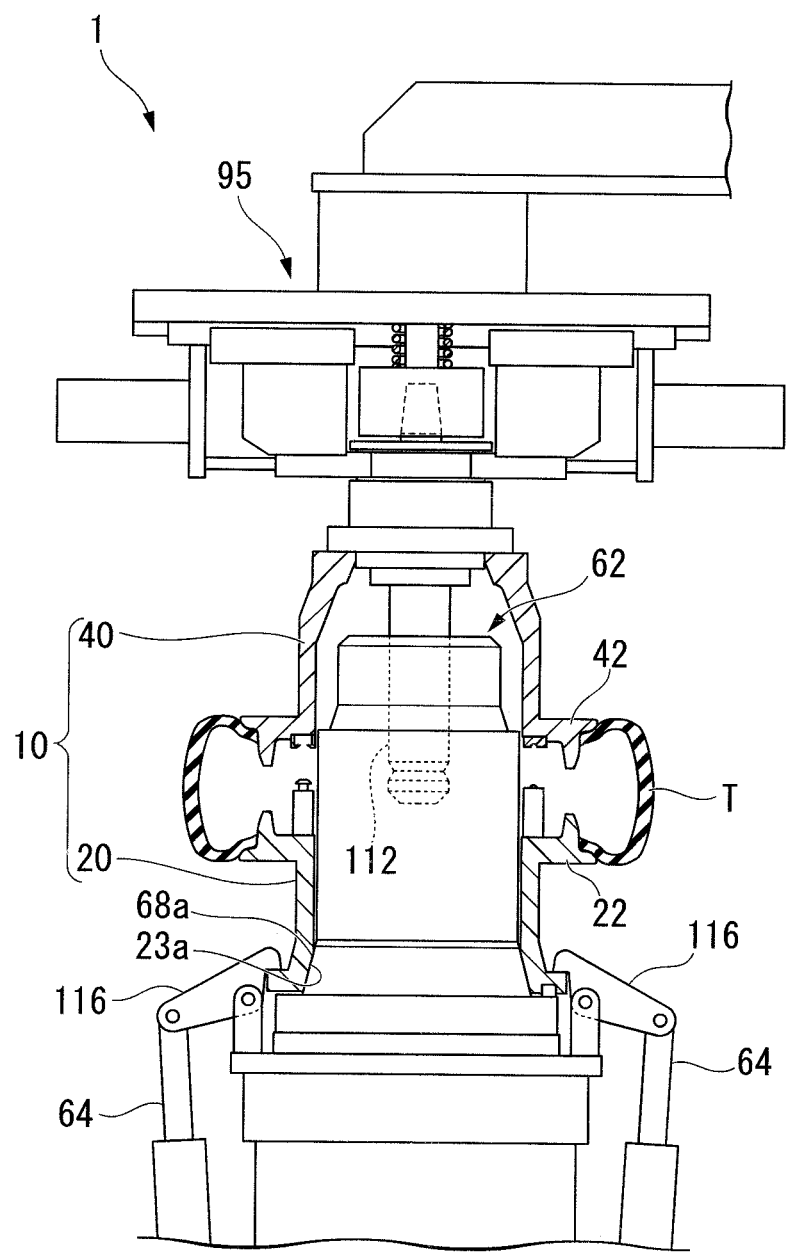
FIG. 28 is a view describing an operation of mounting and measuring a tire on the rim assembly.

After the load distribution is measured, the rotation of the lower spindle 62 is stopped. However, the tire T may be stuck to the collar portion 22 of the lower rim 20 by the pressure of the air inside the tire T. In this case, as shown in FIG. 28, the fixing mechanisms 64 are made in the fixing state, and the lower rim 20 is fixed on the machine-side inclined surface 68a by the hooks 116.

Thereby, when the tire T is stripped from the lower rim 20, it is possible to prevent the lower rim 20 from moving upward along with the tire T stuck to the lower rim 20.

As described above, according to the rim assembly 10 and the tire measuring apparatus 1 of the present embodiment, in the state in which the protruding portions 51 are disposed inside the groove portions 29, when the lower rim 20 is hung below the upper rim 40, the side surfaces 29a of the groove portions 29 are engaged with the protruding portions 51, and the lower rim 20 is supported by the upper rim 40.

In the state in which the lower rim 20 is supported below the upper rim 40, when the tube portion 67 of the lower spindle 62 is inserted into the lower through hole 23 of the lower rim 20, the tube portion 67 may not be smoothly inserted into the lower through hole 23 because the gap between the lower through hole 23 and the tube portion 67 is small.

In this case, the upper rim 40 is operated to push the lower rim 20 downward. However, the stand receiving portions 47 are brought into contact with the stands 28. Thereby, a downward force applied to the upper rim 40 can be reliably transmitted to the lower rim 20. In this case, the protruding portions 51 are separated from both of the side surfaces 29a and 29b of the groove portions 29. As such, the pushing force can be inhibited from being applied to the pins 27.

The upper rim 40 is provided with the insertion opening portions 48. Therefore, the upper rim 40 is disposed on the lower rim 20 so that the first reference surface S1 and the second reference surface S2 face each other, and the stands 28 and the stand receiving portions 47 are brought into contact with each other while the pins 27 are inserted into the insertion opening portion 48. The lower rim 20 is rotated around the axis C1 from this state. Thereby, the protruding portions 51 can be easily disposed inside the groove portions 29.

Further, since the stand receiving portions 47 are formed to extend around the axis C2, the stands 28 and the stand receiving portions 47 overlap in the direction of the axis C1 both of the states in which the pins 27 are inserted into the insertion opening portion 48 and in which the protruding portions 51 are disposed inside the groove portions 29, and the stands 28 and the stand receiving portions 47 are in contact with each other. Accordingly, in each case in which the rim 20 is rotated around the axis C1, the upper rim 40 can be stably supported on the lower rim 20 by the stands 28 and the stand receiving portions 47.

The convex portions 28b are provided for the stands 28 of the lower rim 20, and the concave portions 54 are provided for the stand receiving portions 47 of the upper rim 40.

To release the engagement of the convex portions 28b and the concave portions 54, the upper rim 40 is required to be lifted relative to the lower rim 20. For this reason, when the rim assembly 10 is preserved (in the state in which the upper rim 40 is supported on the lower rim 20), it is possible to prevent the rims 20 and 40 from being relatively rotated around the axis C1 by the gravity applied to the upper rim 40, and prevent the phases around the axis C1 of both of the rims 20 and 40 from deviating. The stand receiving portions 47 are provided with the guide concave portions 55. The concave portions 54 and the guide concave portions 55 are disposed in parallel so as to be separated from each other around the axis C2.

When the stands 28 and the stand receiving portions 47 are brought into contact with each other while the pins 27 are inserted into the insertion opening portion 48, the convex portions 28b are engaged with the guide concave portions 55. When the lower rim 20 is rotated around the axis C1 from this state so that the protruding portions 51 are disposed inside the groove portions 29, the convex portions 28b move along the guide concave portions 55. As such, the upper rim 40 is inhibited from rattling up and down with respect to the lower rim 20, and the upper rim 40 can be smoothly rotated.

Since the stands 28 and the stand receiving portion 47 are disposed around the axis at uniform angles, a force pushing the upper rim 40 downward can be nearly uniformly applied to the lower rim 20 around the axis.

The tire measuring apparatus 1 is equipped with the rim assembly 10, the lower spindle 62, and the servomotor 90. The tire T is mounted on the rim assembly 10, and the tube portion 67 is inserted into the lower through hole 23 of the lower rim 20. Thereby, the rim assembly 10 is mounted on the lower spindle 62. The lower spindle 62 is rotated around the axis C4 by the servomotor 90. Thereby, the mounted rim assembly 10 and tire T are rotated, and uniformity of the tire T can be measured and tested.

While the embodiment of the present invention has been described with reference to the drawings, specific configurations are not limited to the embodiment, and modified examples of the configuration without departing from the gist of the present invention are also included.

Figure 29:
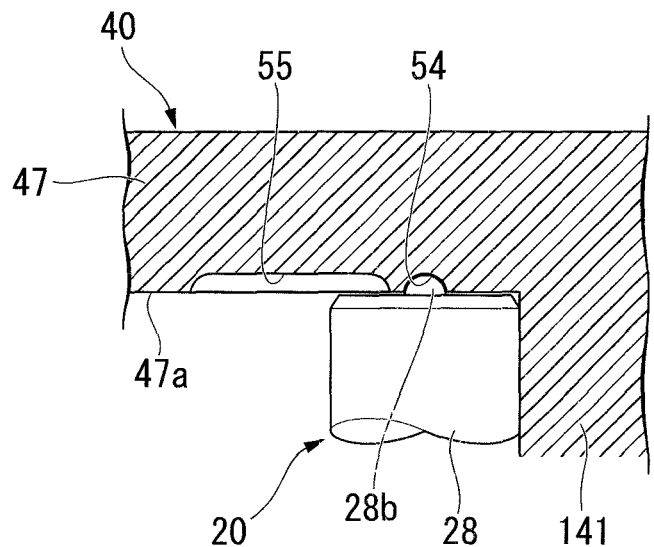
FIG. 29 is a cross-sectional view of main portions in a modified example of the rim assembly.

For example, as shown in FIGS. 10 and 29, the tip faces 47a of the stand receiving portions 47 may be provided with supporting member-side walls 141. The supporting member-side walls 141 are provided for the sides of the protruding portions 51 for the insertion opening portions 48 around the axis C2 based on the positions of the stands 28 when the convex portions 28b are engaged with the concave portions 54. That is, when viewed from the top, the walls 141 are provided around the axis C2 in the counterclockwise direction. The supporting member-side walls 141 are disposed to be capable of coming into contact with the stands 28.

Accordingly, when convex portions 28b are engaged with the concave portions 54 in the rim assembly 10, it is possible to prevent the stands 28 from being rotated around the axis C1 in the counterclockwise direction when viewed from the top. Thereby, it is possible to more reliably prevent the phases around the axis C1 of both of the rims 20 and 40 from deviating.

Figure 30:
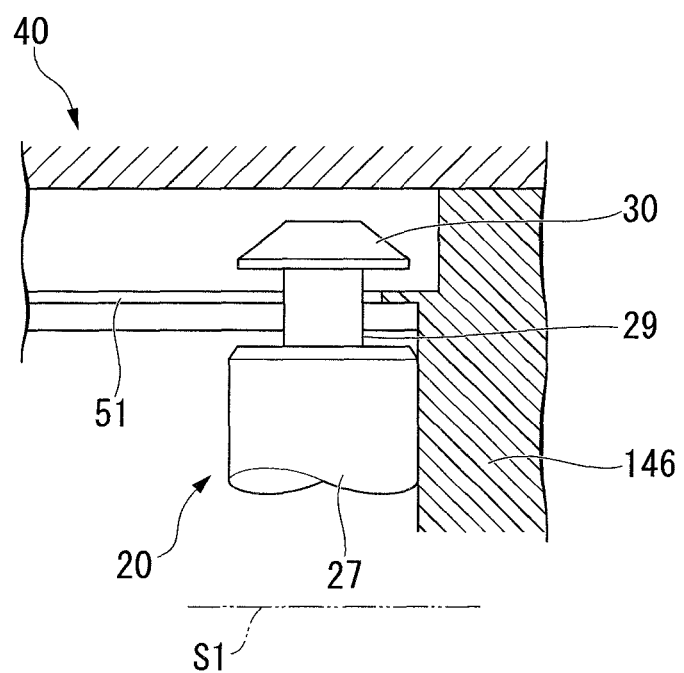
FIG. 30 is a cross-sectional view of main portions in a modified example of the rim assembly.

As shown in FIGS. 10 and 30, when viewed from the top, the protruding portions 51 may be provided with pin-side walls 146 around the axis C2 in the counterclockwise direction based on the positions of the pins 27 when the protruding portions 51 are disposed inside the groove portions 29. The pin-side walls 146 are disposed to be capable of coming into contact with the side of the first reference surface S1 rather than the groove portions 29 in the pins 27.

Accordingly, when the protruding portions 51 are disposed inside the groove portions 29 in the rim assembly 10, it is possible to prevent the pins 27 from being rotated around the axis C2 in the counterclockwise direction when viewed from the top. Thereby, it is possible to more reliably prevent the phases around the axis C1 of both of the rims 20 and 40 from deviating.

Further, the side of the first reference surface S1 rather than the groove portions 29 in the pins 27 is higher in strength against an external force and is more difficult to deform than the projection portions 30. For this reason, it is possible to inhibit the pins 27 from being damaged by the external force.

Figure 31:
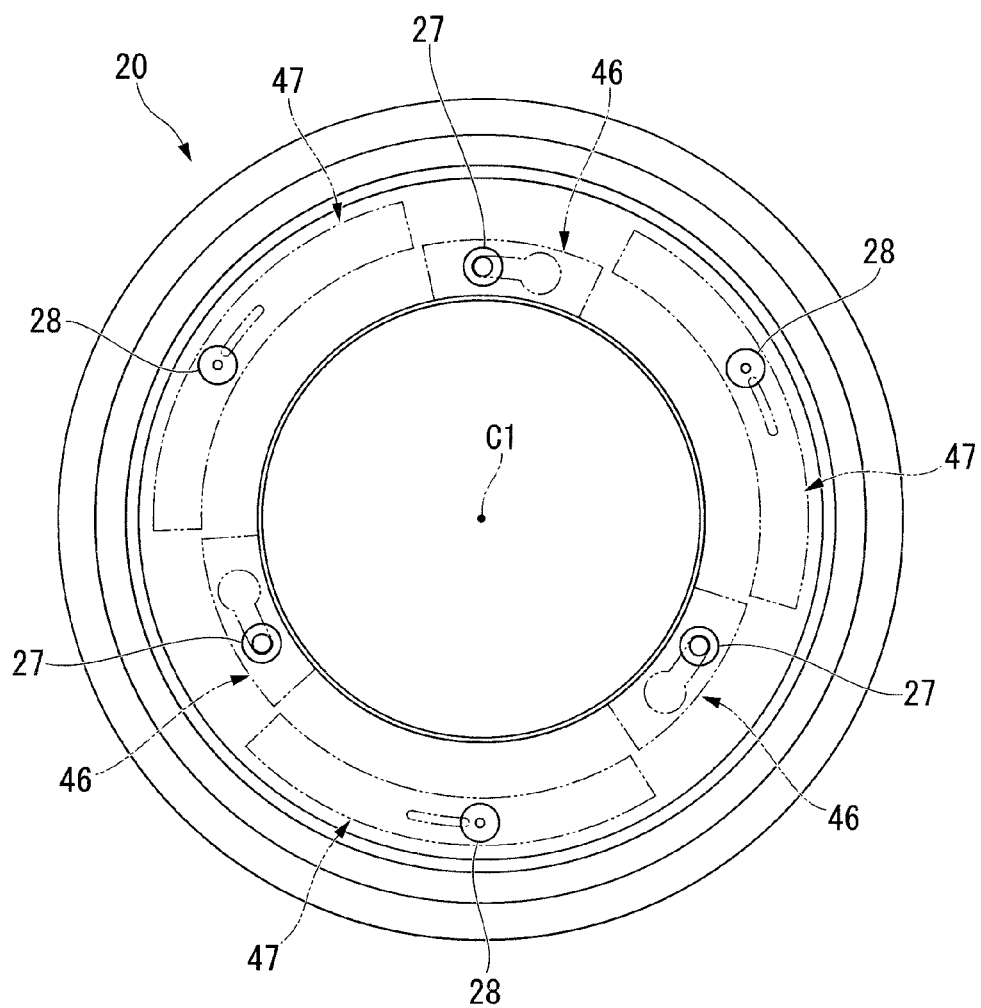
FIG. 31 is a plan view of a lower rim in a modified example of the rim assembly.

In the present embodiment, when viewed from the top, the pins 27 and the stands 28 in the lower rim 20 are provided on the same circumference centered on the axis C1. However, without being limited thereto, as shown in FIG. 31, the pins 27 and the stands 28 may be provided on circumferences having different radii and centered on the axis C1. In the upper rim 40, the pin receiving portions 46 and the stand receiving portions 47 are also similar to the foregoing.

In the present embodiment, the stands 28 are formed in a columnar shape, and the stand receiving portions 47 are formed to extend around the axis C2. However, the stand receiving portions may be formed in a columnar shape, and the stands may be formed to extend around the axis C1. In this case, the protrusions are adapted to be formed on the stand receiving portions, and the concave portions 54 and the guide concave portions 55 are adapted to be formed in the stands.

In the present embodiment, when viewed from the top, the sliding opening portions 49 of the upper rim 40 are disposed in the counterclockwise direction with respect to the insertion opening portions 48. However, when viewed from the top, the sliding opening portions 49 may be disposed in the clockwise direction with respect to the insertion opening portions 48. In this case, the concave portions 54 of the upper rim 40 are disposed in the clockwise direction with respect to the guide concave portions 55. After the projection portions 30 of the lower rim 20 are inserted into the insertion opening portions 48 of the upper rim 40, the lower rim 20 is rotated around the axis C1 in the clockwise direction. Thereby, both of the rims 20 and 40 are adapted to be engaged.

In the present embodiment, instead of fixing the convex portions 28b to the stands 28, the convex portions 28b may be supported upward by a biasing member such as a spring so as to protrude from the tip faces 28a of the stands 28. As the configuration including the biasing member, a known plunger may be used. With this configuration, when the convex portions 28b receive a downward force, the convex portions 28b are pushed into interior sides of the stands 28 from the tip faces 28a against the biasing force of the spring. As such, it is possible to prevent the convex portions 28b from being damaged.

The concave portions 54 are adapted to have a shape recessed in an approximately semispherical shape slightly greater than the convex portions 28b. However, without being limited thereto, if the concave portions 54 are recessed from the tip faces 47a of the stand receiving portions 47 and have a shape in which the convex portions 28b can be engaged, the concave portions 54 are not substantially limited. However, if the concave portions have a shape recessed in a conical shape, this is preferable because a process of forming the concave portions in the stand receiving portions 47 is easy.

In the present embodiment, the guide concave portions 55 may not be formed. In this case, when the upper rim 40 is engaged with the lower rim 20, the assembly is as follows.

When the upper rim 40 is disposed above the lower rim 20 so as to face the lower rim 20, and when the projection portions 30 of the pins 27 are inserted into the insertion opening portion 48, the convex portions 28b are slightly separated from the stand receiving portions 47 without bringing the stands 28 into contact with the stand receiving portions 47. The rims 20 and 40 are relatively rotated around the axis C1. Thereby, the protruding portions 51 of the pin receiving portion 46 are disposed inside the groove portions 29 of the pins 27. When viewed from the top, when the positions (relative positions) of the concave portions 54 and the convex portions 28b are consistent, the upper rim 40 is lowered on the lower rim 20, thereby the tip faces 28a of the stands 28 come into contact with the tip faces 47a of the stand receiving portions 47, and the convex portions 28b are simultaneously engaged with the concave portions 54.

In the present embodiment, the stand receiving portions 47 may be provided for the lower rim 20, and the pins 27 may be provided for the upper rim 40. Further, the convex portions may be provided for the stand receiving portions 47, and the concave portions may be provided for the stands 28.

In the present embodiment, to supply the air to the hole portion 72, a dedicated supply part different from the air source 73 may be provided.

Further, in the present embodiment, the tire testing machine is used as a tire uniformity measuring apparatus. However, without being limited thereto, the tire testing machine may be a tire balance measurement machine.

[Industrial Applicability]

The present invention is directed to a rim assembly on which a tire as a test object is mounted, and a tire testing machine. According to the present invention, even when the upper rim is pushed to the side of the lower rim, the pushing force can be inhibited from being applied to the pins.

REFERENCE SIGNS LIST

1 tire measuring apparatus (tire testing machine)
10 rim assembly
20 lower rim (first rim)
23 lower through hole (through-hole)
27 pin
28 stand (first supporting member)
28b convex portion
29 groove portion
40 upper rim (second rim)
47 stand receiving portion (second supporting member)
48 insertion opening portion
51 protruding portion
54 concave portion
55 guide concave portion
67 tube portion (inserting part)
90 servomotor (rotating part)
141 supporting member-side wall
146 pin-side wall
C1, C2 axis
L extension line
S1 first reference surface
S2 second reference surface
T tire

The invention claimed is:

1. A rim assembly which is inserted into an inserting part of a tire testing machine and on which a tire as a test object is mounted, the rim assembly comprising:
    a first rim on which a first reference surface is formed;
    a second rim on which a second reference surface is formed;
    a through-hole which extends to intersect the first reference surface of the first rim, and into which the inserting part is insertable;
    pins which are erected on one of the first reference surface and the second reference surface, and around outer peripheral surfaces of which groove portions are formed;
    protruding portions which are formed on the other of the first reference surface and the second reference surface is engageable with the groove portions when the first rim is rotated around an axis of the first rim relative to the second rim in a state in which the second reference surface is caused to face the first reference surface;
    first supporting members that are provided for the first reference surface; and
    second supporting members which are provided for the second reference surface, are brought into contact with the first supporting members when the first and second reference surfaces approach each other with the protruding portions disposed inside the groove portions and the protruding portions are separated from opposite side surfaces of the groove portions, and are separated from the first supporting members when the first and second reference surfaces are separated from each other and the protruding portions are engaged with the opposite side surfaces of the groove portions.

2. The rim assembly according to claim 1, further comprising insertion opening portions that are formed on extension lines of the protruding portions around the axis and are configured to dispose the groove portions of the pins,
    wherein at least one of the first and second supporting members is formed to extend around the axis and overlap in a direction of the axis in both states in which the pins are inserted into the insertion opening portions and in which the protruding portions are disposed inside the groove portions.

3. The rim assembly according to claim 1, wherein:
    the first supporting members have protrusions formed to protrude from surfaces coming into contact with the second supporting members in a state in which the protruding portions are disposed inside the groove portions; and
    the second supporting members have concave portions engaged with the convex portions when the first supporting members and the second supporting members are brought into contact with each other.

4. The rim assembly according to claim 3, wherein:
    the second supporting members have guide concave portions extending from positions facing the convex portions in directions of the protruding portions around the axis when the pins are inserted into the insertion opening portions;

the concave portions are provided at the positions facing the convex portions when the protruding portions are disposed inside the groove portions; and the guide concave portions and the concave portions are disposed in parallel so as to capable of being separated from each other around the axis.

5. The rim assembly according to claim 2, wherein the second supporting members have supporting member-side walls that are provided on surfaces coming into contact with the first supporting members in directions of the protruding portions for the insertion opening portion around the axis based on the first supporting members when the convex portions are engaged with the concave portions and are capable of coming into contact with the first supporting members.

6. The rim assembly according to claim 2, wherein the protruding portions have pin-side walls that are provided in directions of the protruding portions for the insertion opening portion around the axis based on the pins when the protruding portions are disposed inside the groove portions and are capable of coming into contact in directions of base ends of the pins rather than the groove portions in the pins.

7. A tire testing machine comprising:
the rim assembly according to claim 1;
an inserting part capable of being inserted into a through-hole formed in the first rim; and
a rotating part configured to rotate the inserting part around the axis of the inserting part.

* * * * *